United States Patent [19]

Larson et al.

[11] Patent Number: 4,981,523
[45] Date of Patent: * Jan. 1, 1991

[54] VEHICLE CLEANING SYSTEM AND METHOD

[75] Inventors: Sherman L. Larson, Palmyra; Daniel DelPrato, Marlton, both of N.J.; Carl C. Beer, Philadelphia, Pa.; Anthony J. Tomasello, Allison Park, Pa.; Ray Hoy, Butler, Pa.

[73] Assignee: Sherman Industries, Inc., Palmyra, N.J.

[*] Notice: The portion of the term of this patent subsequent to Aug. 7, 2007 has been disclaimed.

[21] Appl. No.: 861,326

[22] Filed: May 9, 1986

[51] Int. Cl.$^5$ .............................................. B08B 7/00
[52] U.S. Cl. ..................... 134/18; 15/DIG. 2; 134/45; 134/172; 134/181; 134/197
[58] Field of Search ................... 134/18, 172, 45, 197, 134/181; 15/DIG. 2

[56] References Cited

U.S. PATENT DOCUMENTS

| | | | |
|---|---|---|---|
| 3,559,659 | 2/1971 | Gongonlas | 134/45 |
| 3,570,502 | 3/1971 | Farnsworth | 134/45 |
| 3,854,054 | 12/1974 | Conn | 134/45 |

FOREIGN PATENT DOCUMENTS

| | | | |
|---|---|---|---|
| 1465327 | 1/1967 | France | 15/DIG. 2 |
| 1344057 | 1/1974 | United Kingdom | 15/DIG. 2 |
| 1344059 | 1/1974 | United Kingdom | 15/DIG. 2 |

*Primary Examiner*—Asok Pal
*Attorney, Agent, or Firm*—Ratner & Prestia

[57] ABSTRACT

A fluid distribution apparatus is provided which includes a sensor for developing control signals representative of the profile of a vehicle to be cleaned and a tube for distributing fluid. The tube is movable horizontally in directions parallel to the path of a vehicle being cleaned and vertically toward and away from the path of the vehicle. Movements of the tube are controlled to position the tube in front of the vehicle and move the tube in the direction of movement of the vehicle and to position the tube above the vehicle and move the tube in a direction opposite that of the vehicle and simultaneously move the tube vertically to follow the profile of the vehicle. The tube is also positioned behind the vehicle and moved in the direction of the vehicle after the profiling. Oscillatory movement of the tube about a plurality of angular positions is also provided.

43 Claims, 24 Drawing Sheets

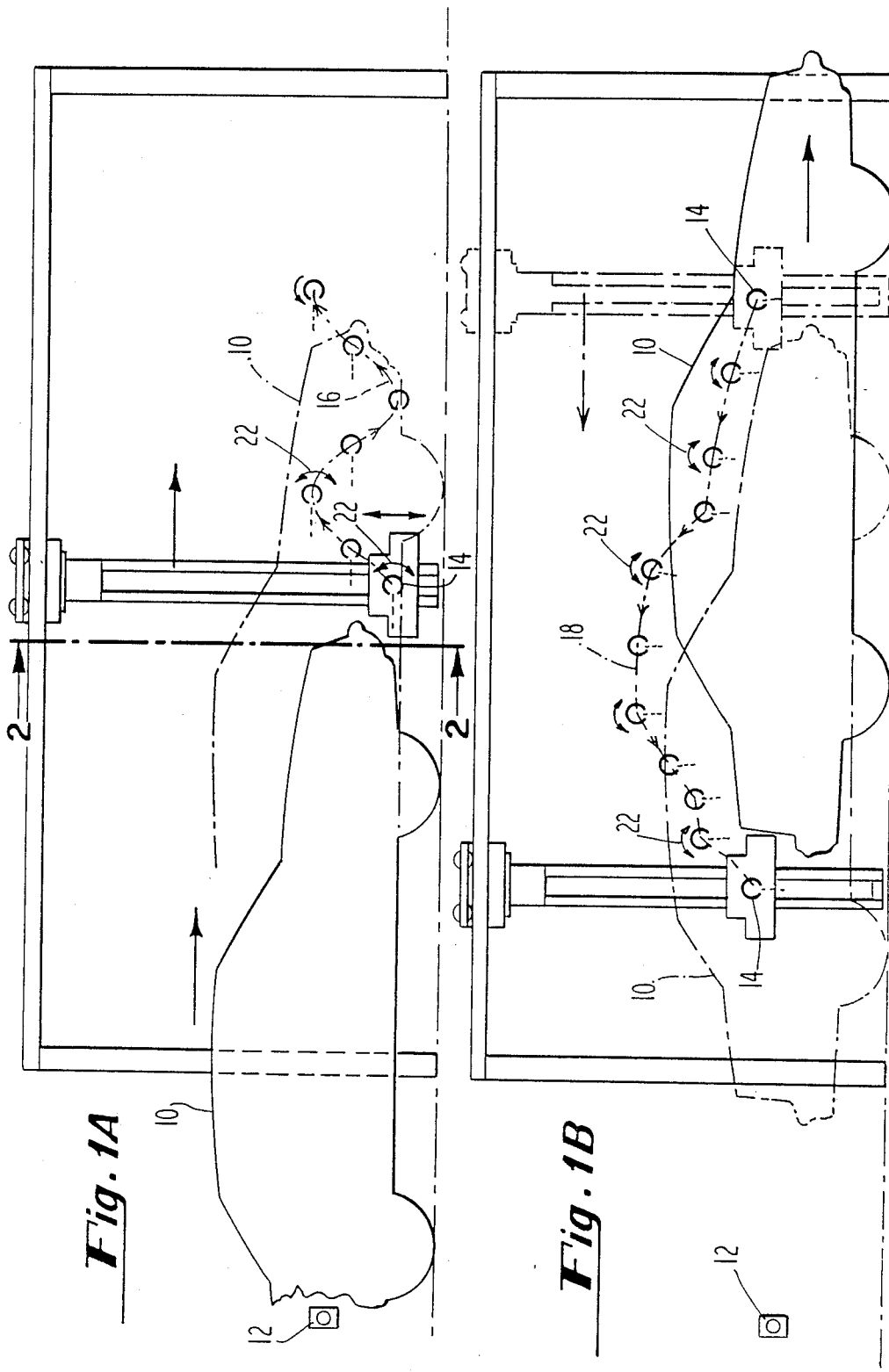

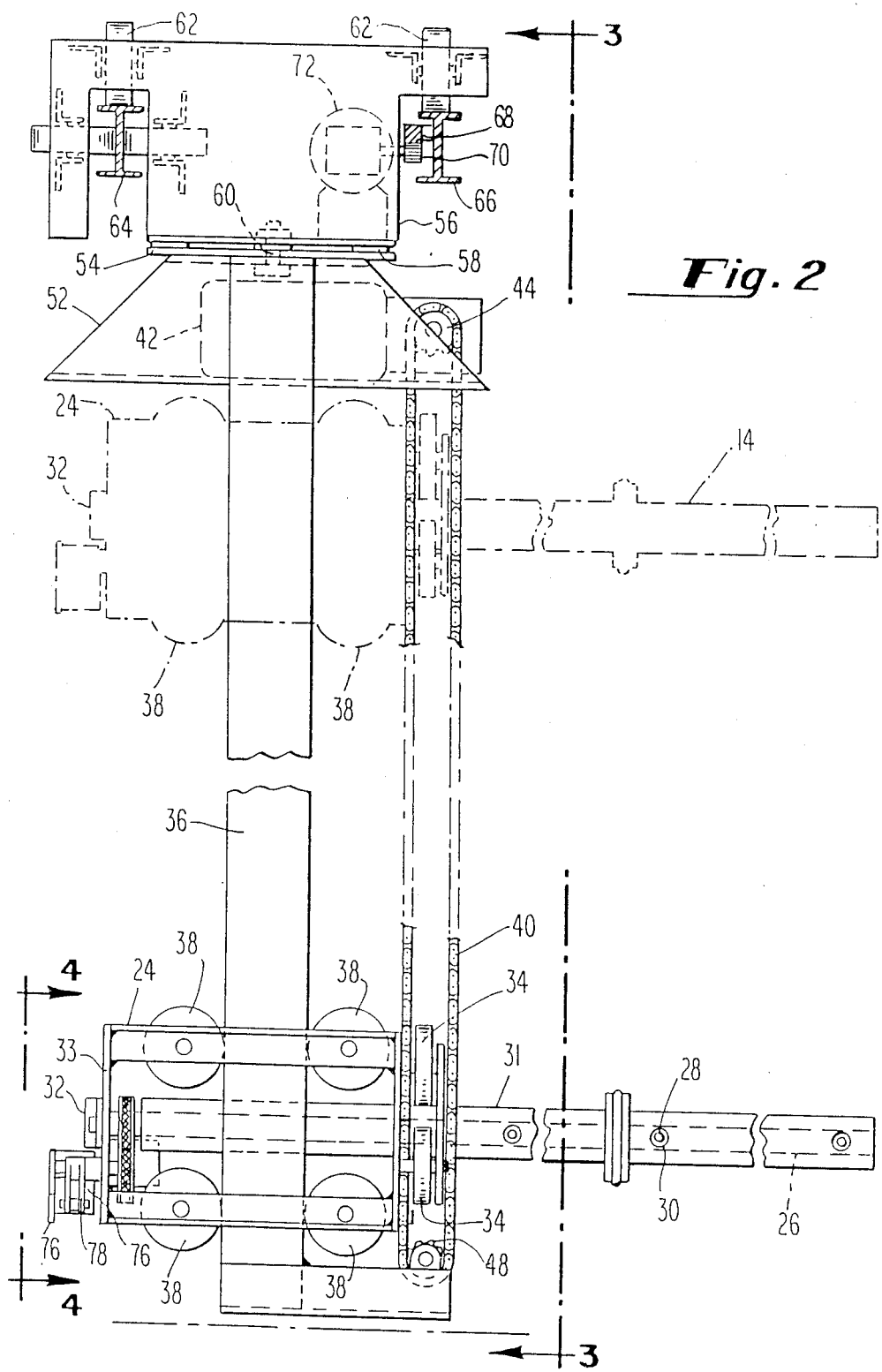

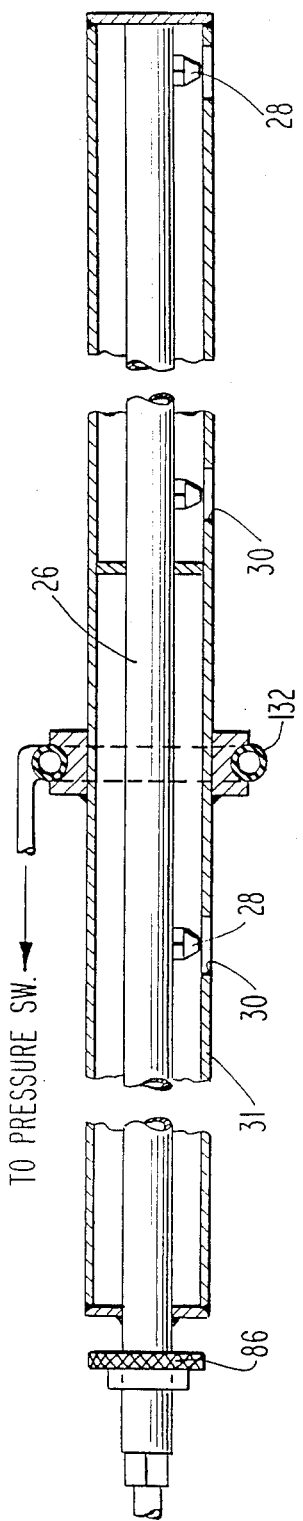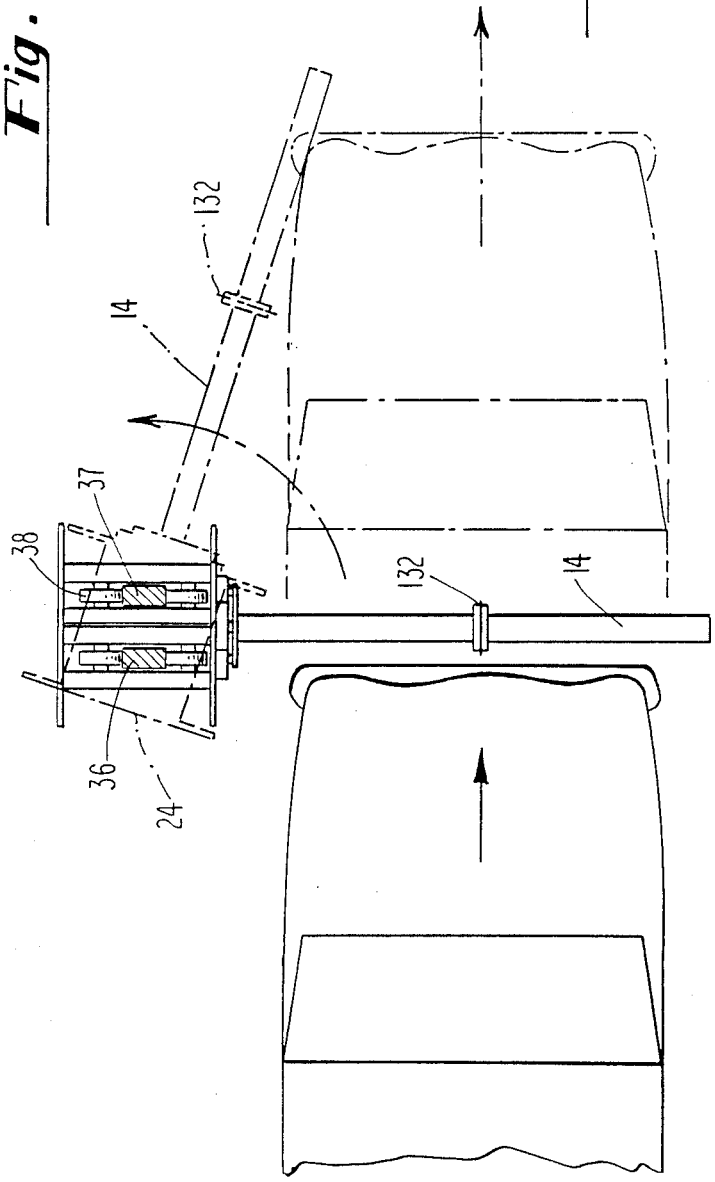
Fig. 6
Fig. 7

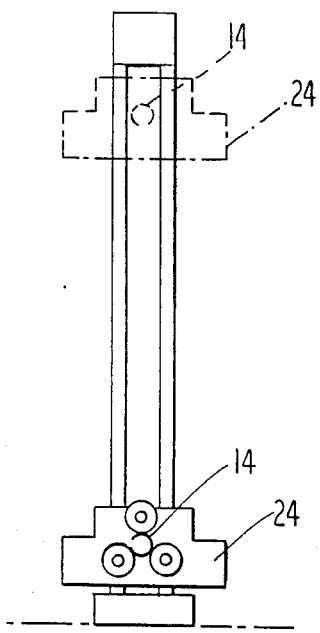
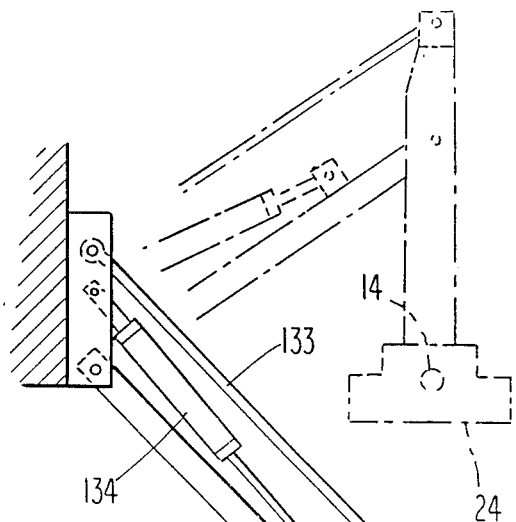
Fig. 8
Fig. 9
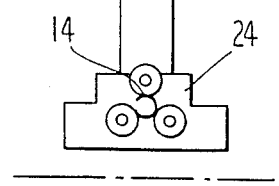
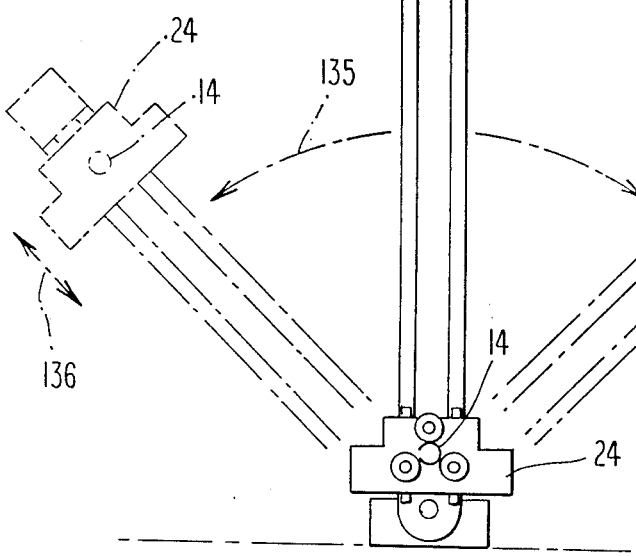
Fig. 10

VEHICLE CLEANING SYSTEM AND METHOD

TECHNICAL FIELD

The present invention relates, in general, to vehicle cleaning and, in particular, to fluid distribution apparatus for use in vehicle cleaning systems.

BACKGROUND ART

Many automatic vehicle washers are currently in use. Typically, automatic vehicle washers have a number of stations at which a vehicle moving through the washer is sprayed with cleaning liquid, scrubbed and brushed, and dried.

Generally, the cleaning liquid sprayers are in the form of a stationary array of nozzles through which cleaning liquid is ejected under pressure as the vehicle passes the nozzles. Very often, such units are not adequately effective in cleaning vehicles For example, the front and rear of the vehicle normally accumulates more road dirt and grime than the hood or top. A single pass of the vehicle through a stationary sprayer unit may provide insufficient exposure to the high pressure spray to clean the front or rear of the vehicle.

Also, stationary liquid sprayers are designed for the largest dimensions of the largest vehicle which the washer is expected to clean. Consequently, certain surfaces of the largest expected vehicle and certain surfaces of smaller vehicles receive the liquid spray at a reduced pressure, whereby a portion of the cleaning effect due to the liquid hitting against the vehicle is lost.

These and other problems associated with stationary liquid sprayers have prompted development of movable nozzle arrays which apply the cleaning liquid in closer proximity with the vehicle or expose the vehicle to more of a spray than is possible with a single pass of the vehicle through a stationary nozzle array. For example, certain vehicle washers have liquid sprayers which swing back-and-forth along the path of movement of the vehicles. Others have sprayers which spring up from the conveyor as the vehicle approaches to clean the front of the vehicle and as the vehicle passes to clean the rear of the vehicle.

For the most part, moving liquid sprayers developed to date have not satisfied concurrently the requirements of properly cleaning the vehicles and efficient operation. While the spraying time has been increased to expose the vehicle to more liquid spray, the sprayers currently in use are not arranged to maximize the cleaning effect of the sprayers nor are they arranged to spray those portions of the vehicle which most require cleaning with adequate spray.

U.S. Pat. No. 4,562,848 issued to Messing et al discloses a car cleaning system in which nozzles are moved radially along a bar which is swung to allow the nozzles to pass over the car. However, Messing et al does not disclose a practical way to allow the nozzles to dwell sufficiently upon the areas of the car which accumulate more road dirt and grime.

DISCLOSURE OF THE INVENTION

Accordingly, it is an objective of the present invention to provide new and improved fluid distribution apparatus for vehicle cleaning systems. It is another objective of the present invention to provide fluid distribution apparatus which applies cleaning liquid to a vehicle in an effective and efficient manner.

It is a further objective of the present invention to provide fluid distribution apparatus which overcomes the shortcomings and limitations of vehicle cleaning liquid sprayers currently in use.

These and other objectives are achieved, according to the present invention, by fluid distribution apparatus which includes sensor means for developing control signals representative of the profile of a vehicle to be cleaned and means for distributing fluid. The fluid distributing means are movable horizontally in directions parallel to a predetermined path along which a vehicle being cleaned moves. The fluid distributing means also are movable vertically toward and away from the path of movement of the vehicle.

Movements of the fluid distributing means are controlled by control means which respond to the control signals developed by the sensor means to:

(1) position the fluid distributing means in front of the vehicle and move the fluid distributing means in the direction of movement of the vehicle when the fluid distributing means are positioned in front of the vehicle;

(2) position the fluid distributing means above the vehicle and move the fluid distributing means in a direction opposite to the movement of the vehicle and simultaneously move the fluid distributing means vertically to follow the profile of the vehicle when the fluid distribution means are positioned above the vehicle; and (3) position the fluid distributing means behind the vehicle and move the fluid distributing means in the direction of movement of the vehicle when the fluid distributing means are positioned behind the vehicle.

A specific aspect of the present invention is a new and improved fluid spray system which includes a nozzle assembly mounted for oscillatory movement about a plurality of angular positions and means for supplying fluid under pressure to the nozzle assembly Also included are a source of rotary motion and a crank assembly coupled between the source of rotary motion and the nozzle assembly for converting rotary motion to oscillatory movement. The crank assembly has a variable length crank arm composed of first and second members movable relative to one another along an axis. The fluid spray system further includes means for locking the first and second members together at a plurality of axial positions to establish a plurality of lengths of the crank arm and the plurality of angular positions of the nozzle assembly.

BRIEF DESCRIPTION OF THE DRAWINGS

Referring to the drawings

Figures 1A, 1B, and 1C illustrate the sequence of applying fluid to a vehicle by a fluid distribution apparatus constructed in accordance with the present invention.

FIG. 2 is a front view, partially in section, of fluid distribution apparatus constructed in accordance with the present invention.

FIG. 4B is a schematic representation of control circuitry for rotating the tube assembly of the present invention.

FIG. 6 is a vertical section of the spray tube assembly portion of the present invention.

FIG. 7 is a top view which illustrates the operation of the safety features of the present invention.

FIGS. 8, 9, and 10 are schematic diagrams of alternate embodiments of the present invention.

FIG. 27 is a flowchart representation of a rear tracking routine of the present invention.

BEST MODES OF CARRYING OUT THE INVENTION

Figure 1C:
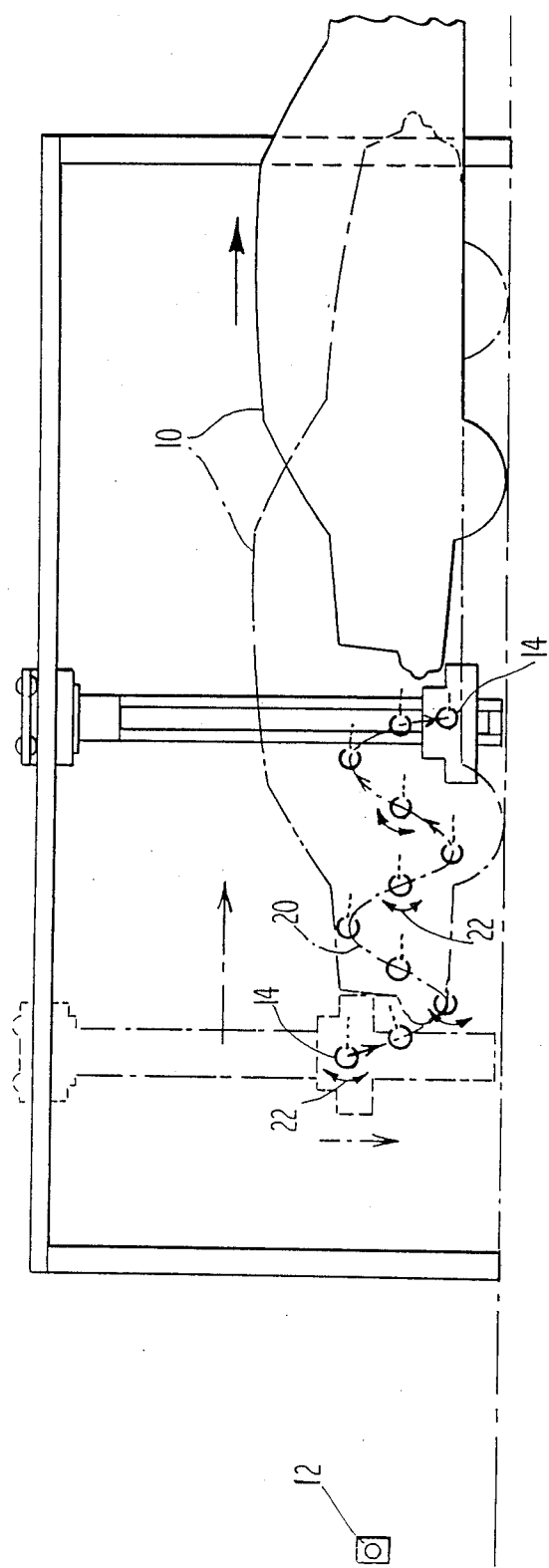

Figures 1A, 1B and 1C schematically illustrate the operation of fluid distribution apparatus constructed in accordance with the present invention. Such apparatus may include control system 640 shown in FIG. 14 having sensor means for developing control signals representative of the profile of a vehicle 10 which is to be cleaned. The sensor means may be represented by a camera 12 on other light sensitive devices and will be considered in greater detail below.

Fluid distribution apparatus, constructed in accordance with the present invention, further includes means for distributing fluid for application to vehicle 10. Such means may include a tube assembly 14 extending horizontally transverse to the path along which vehicle 10 moves. The details of tube assembly 14 will be considered below. For the moment, it will be sufficient to state that liquid under pressure is supplied to the interior of tube assembly 14 and is ejected along the length of the tube assembly.

Tube assembly 14 is mounted for movement horizontally in directions parallel to the path of movement of vehicle 10 and vertically in directions toward and away from the path of movement of the vehicle. The movement of member tube assembly 14 is controlled by a controller system which responds to the control signals developed by camera 12. In particular, as shown in Figure 1A, tube assembly 14 is positioned in front of vehicle 10 to acquire vehicle 10 when vehicle 10 is a predetermined distance from tube assembly 14. Tube assembly 14 then moves along an X-axis in the direction of movement of the vehicle when positioned in front of vehicle 10 to perform front tracking of vehicle 10. If desired, tube assembly 14 can be moved vertically along a Y-axis at the same time that it is moved horizontally in the direction of movement of vehicle 10, thereby following any desired path such as the generally sinusoidal path 16 indicated in Figure 1A.

Upon reacting a designated point, tube assembly 14 is positioned above vehicle 10 and moves in a direction opposite to the movement of the vehicle and simultaneously moves vertically to follow the profile of the vehicle while positioned above the vehicle 10 to perform reverse slewing and contouring of vehicle 10. This is shown in FIG. 1B by the path 18 which is generally similar to the profile of vehicle 10.

Upon reaching a designated point, tube assembly 14 is positioned behind vehicle 10 and moves in the direction of movement of the vehicle while the tube is positioned behind vehicle 10 to perform rear tracking of vehicle 10. Again, tube assembly 14 can undergo vertical movements at the same time that it moves in the direction of movement of vehicle 10, thereby following any desired path such as the generally sinusoidal path 20 shown in Figure 1C.

Tube assembly 14 is oriented to spray the front of vehicle 10 when positioned in front of the vehicle, spray the top of vehicle 10 when positioned above the vehicle, and spray the rear of vehicle 10 when positioned behind the vehicle. This is accomplished by rotating tube assembly 14 in the proper directions when the tube assembly reaches the end of its horizontal movements, first while positioned in front of vehicle 10, second while positioned above the vehicle, and third while positioned behind the vehicle. In addition, in order to increase the effect of the spray ejected from tube assembly 14, the tube assembly can be oscillated, as represented by arrows 22 in Figures 1A, 1B and 1C.

FIGS. 2, 3, 4, 4A, 4B and 5 illustrate the mechanisms for moving tube assembly 14 in the manner just described. FIG. 6 shows the details of tube assembly 14.

Tube assembly 14 is mounted at one end in a vertically movable housing 24 An inner tube 26, having a plurality of nozzles 28 aligned with a plurality of holes 30 in an outer tube 31, is positioned within tube 31 and fixed with respect to tube 31. Tube assembly 14 is mounted in housing 24 by means of a bearing 32 is attached to a wall 33 of the housing and receives one end of inner tube 26 and a planetary bearing unit, composed of three rotatable disks 34, which is attached to a wall 35 of the housing and engage outer tube 31. Bearing 32 is attached to the rear wall of movable housing 24 and disks 34 are attached to the front wall of the housing.

Figure 3:
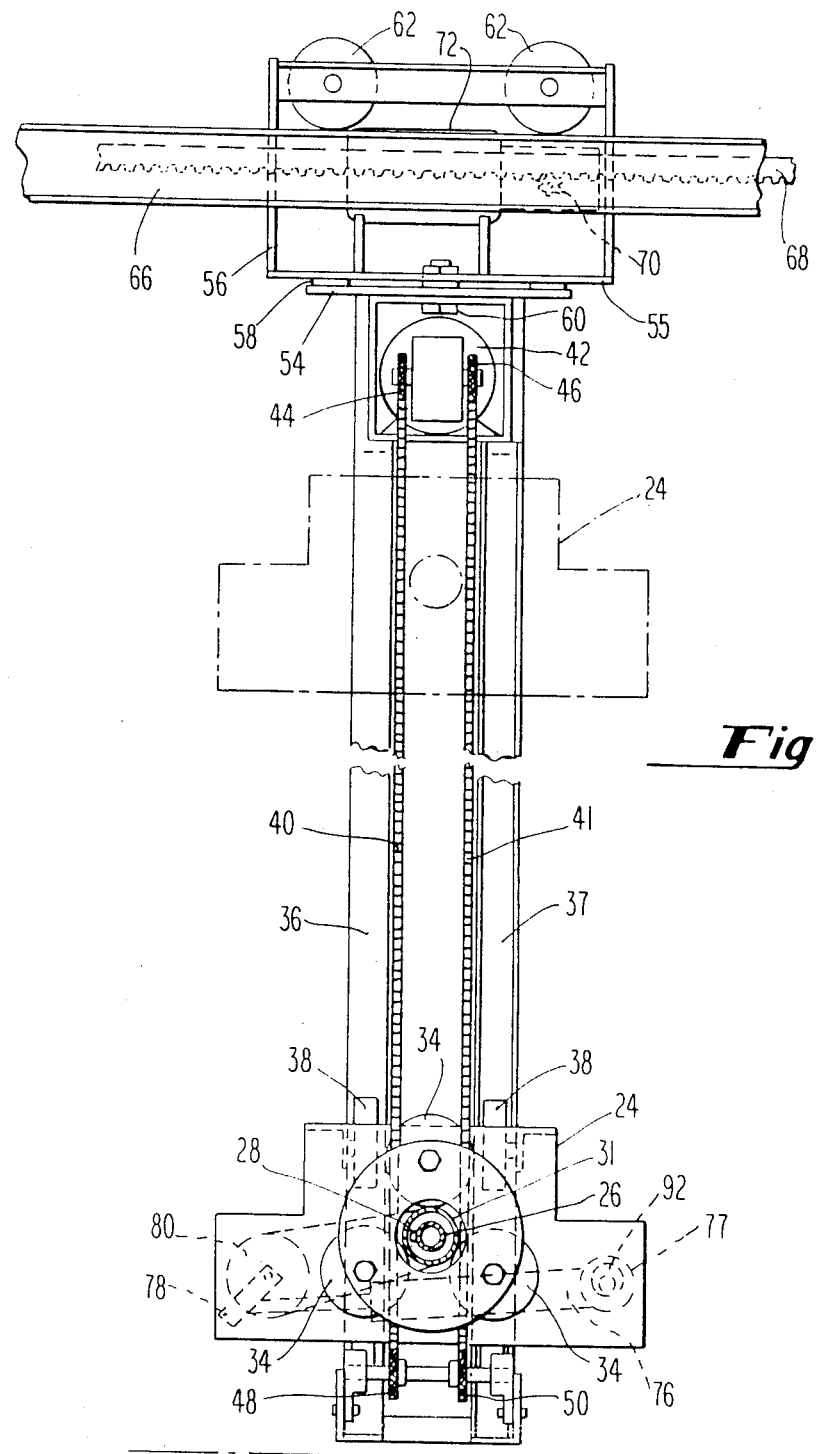
FIG. 3 is a vertical section taken along line 3—3 of FIG. 2.

Movable housing 24 is mounted for Y-axis movement on a pair of columns 36 and 37 by means of a plurality of rollers 38 attached for rotation to the housing. Movable housing 24 moves vertically along columns 36 and 37 as a pair of chains 40 and 41 is driven by a motor 42. Specifically, motor 42 is coupled to a pair of drive sprockets 44 and 46 which, in turn, cause the chains to move along the Y-axis in a direction determined by the direction of motor 42. Chains 40 and 41 move about a pair of idler sprockets 48 and 50 mounted to rotate freely at a point below the lower most point of travel of movable housing 24. Movable housing 24 is fastened to chain 40 and 41 so that as the chains move up or down, movable housing 24 moves up or down with the chains FIGS. 2 and 3 show movable housing 24 and tube assembly 14 in phantom at an elevated position.

Motor 42 is mounted within a frame 52 to which columns 36 and 37 are attached at their upper ends. Frame 52, in turn, is attached to a horizontally disposed plate 54 which is mounted for pivotal movement relative to the bottom wall 55 of a horizontally movable housing 56. Specifically, plate 54 is spaced from bottom wall 55 of movable housing 56 by a low friction bearing pad 58 and is attached to the movable housing 56 by means of a bolt 60 extending through plate 54, bearing pad 58 and lower wall 55 of movable housing 56. As a result, frame 52, columns 36 and 37, movable housing 26 and tube assembly 14 all can swing as a unit, relative to movable housing 56, about bolt 60. This is illustrated in FIG. 7 and will be considered again below.

Returning to FIGS. 2 and 3, movable housing 56 is mounted for X-axis movement parallel to the path along which vehicle 10 moves. This is accomplished by a plurality of rollers 62 which are attached to movable housing 56 and roll along a pair of horizontal rails 64 and 66, shown in FIG. 2 as having an I-beam cross-section. A rack 68 is attached to the inside surface of the web of rail 66 and is engaged by a pinion 70 which is driven by a motor 72 to move movable housing 56 along rails 64 and 66.

Figure 5:
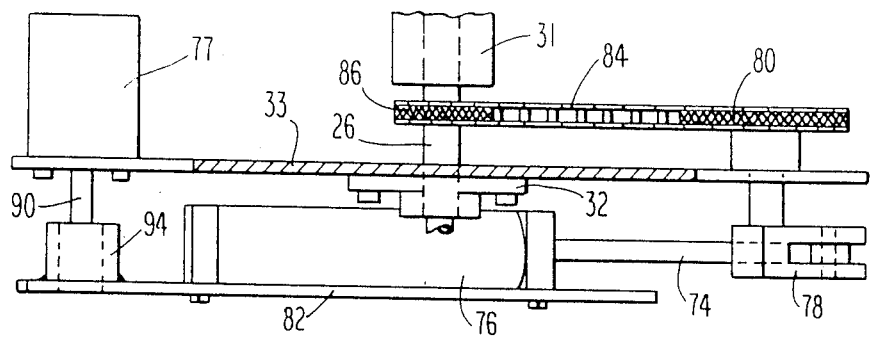
FIG. 5 is a horizontal section taken along line 5—5 of FIG. 4.
Figure 4:
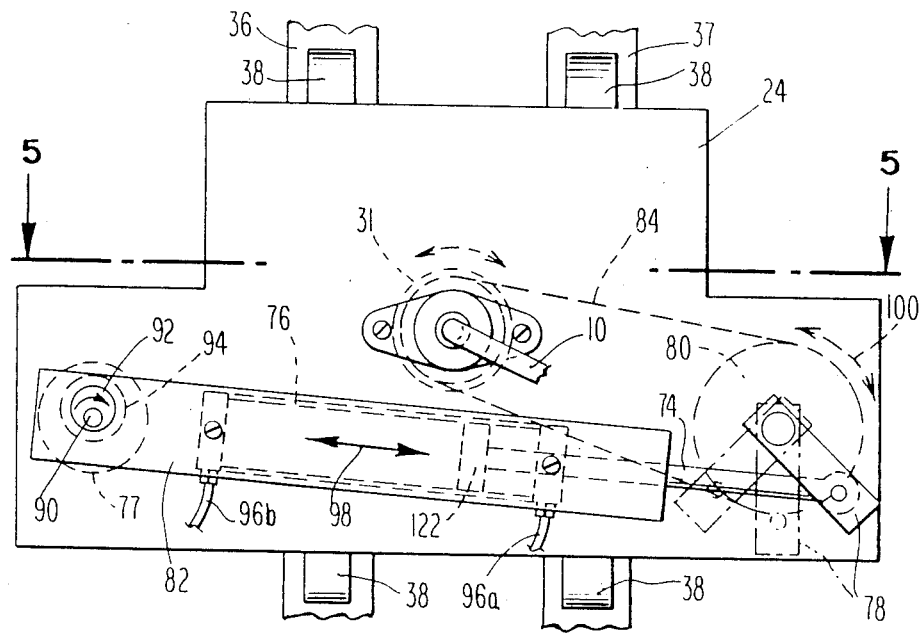
FIG. 4 is a side view showing the details of the mechanism which positions and oscillates the spray tube assembly portion of the present invention.
Figure 4A:
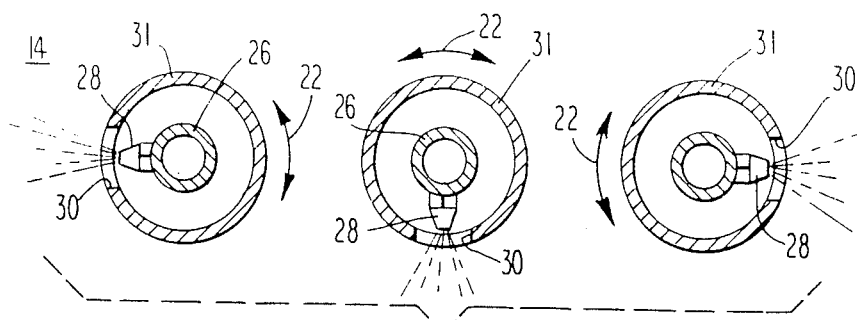
FIG. 4A illustrates the positions of the spray tube assembly portion of the present invention.

FIGS. 4, 4B and 5 show the details of mechanism which produces the positioning and oscillation of tube assembly 14 as depicted in FIG. 4A. The three angular positions of tube assembly 14 shown in FIG. 4A are established by locking a piston rod 74 of a hydraulic cylinder at three axial positions within the cylinder housing 76 the hydraulic cylinder The hydraulic cylinder functions as a variable length crank arm of a crank assembly coupled between a motor 77 and tube assembly 14. Piston rod 74 is pivotally connected to a yoke 78 which is fixed to a drive sprocket 80 Cylinder 76 of the hydraulic cylinder is attached to a mounting plate 82. A sprocket chain 84 extends between drive sprocket 80 and another sprocket 86 which is mounted on inner tube 26 of tube assembly 14.

Mounting plate 82 is coupled to motor 77 which, in turn, is mounted on wall 33 of movable housing 24. Drive shaft 90 of motor 77 carries an eccentric 92 which engages a bushing 94 secured to mounting plate 82.

The extension of piston rod 74 causes rotation of tube assembly 14 so that tube assembly 14 may spray fluid forward, downward or rearward After an angular position for tube assembly 14 is selected, corresponding to one of the three shown in FIG. 4A, the rotary motion of motor 77 causes plate 82 and the hydraulic cylinder carried by plate 82 to reciprocate generally along the directions indicated by arrow 98. This, in turn, causes yoke 78 to oscillate about the angular position to which it was originally set. As yoke 78 oscillates, drive sprocket 80 also oscillates. The arrow, identified by reference numeral 100, indicates the oscillation of drive sprocket 80. As drive sprocket 80 sprocket chain 84 transfers the oscillations of drive sprocket 80 to sprocket 86 which, in turn, causes inner tube 26 to oscillate Fluid is supplied under pressure from a pump (not shown) to inner tube 26 through an inlet tube 101 and a suitable coupling between the inlet tube and the inner tube and is sprayed by the tube assembly over a sector determined by the angle through which the tube assembly is oscillated.

FIG. 4B schematically illustrates hydraulic circuit 102 which may be used to rotate tube assembly 14 to the three positions previously described. Normally opened three-way air solenoid valve 106 allows air at approximately 80 psi into oil reservoir 112 to flow into cylinder 76 to the left of piston 122. Exhaust 108 of three-way normally closed solenoid valve 110 allows air to escape from oil reservoir 114 as oil is forced from the right side of cylinder 76 and into reservoir 114. Thus the rest position of piston rod 74 is fully extended causing tube assembly 14 to spray forward When tube assembly 14 sprays downward, down spray relay 128 is activated applying 120 volts AC to valves 106,110. This causes valve 106 to close and valve 110 to open. When valve 110 is opened, air is allowed to pass into oil reservoir 114 forcing oil from oil reservoir 114 into cylinder 26 to the right of piston 122. Exhaust 108 of valve 106 allows air to escape from oil reservoir 112. Thus piston 122 is forced to the left.

When piston 122 reaches position 120, indicated in phantom, switch actuator 124 makes contact with limit switch 126 applying 120 volts AC to oil lock solenoid valve 116. Valve 116 prevents oil from passing out of cylinder 76 when actuated. Thus piston 122 is locked in position 120 causing tube assembly 14 to spray downward. When tube assembly 14 is to spray to the rear, rear spray relay 130 is activated. This causes valve 106 to close, valve 110 to open, and piston 122 to be forced to the left as previously described. Activation of relay 130 also causes power to limit switch 126 to be cut, causing lock valve 116 to open. Thus piston 122 moves to position 118 causing tube assembly 14 to spray to the rear.

Figure 14:
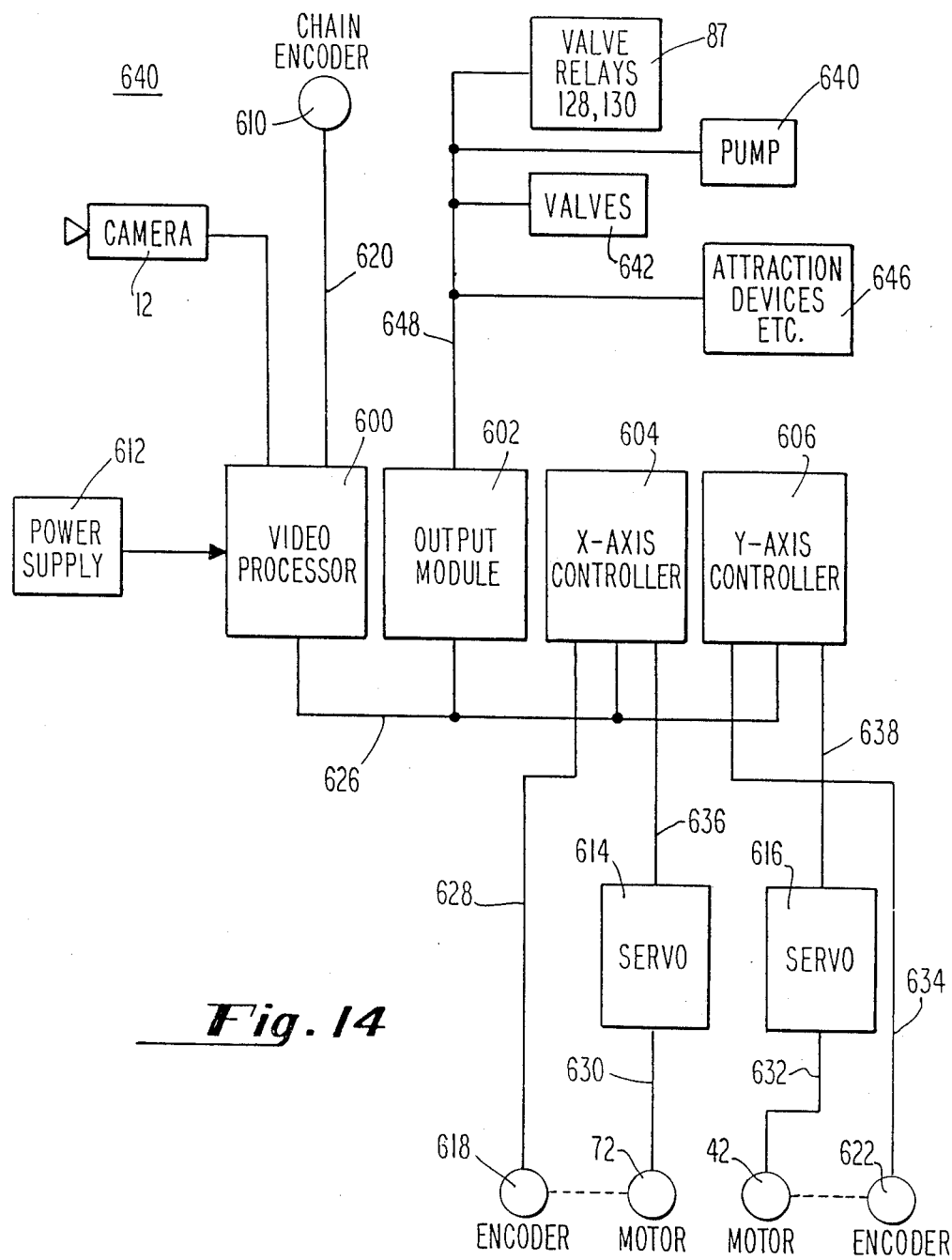
FIG. 14 is a block diagram of the electrical hardware of the present invention.

FIGS. 6 and 7 illustrate safety features, incorporated in the present invention, which protect against damaging a vehicle or the spraying apparatus upon the vehicle hitting the spraying apparatus. As shown in FIG. 6, a flexible tube 132 is mounted on outer tube 31 at its midpoint. Flexible tube 132 carries a fluid which controls movement of the conveyor which carries the vehicle through the system. Upon impact with a vehicle, tube 132 is compressed to cut off fluid flow, which, in turn, stops movement of the conveyer. If the vehicle overshoots the impact point or if the conveyor continues to move the vehicle along its path, tube assembly 14 swings out of the path of movement of the vehicle because of the pivotal mounting of plate 54 to movable housing 56. Referring now to FIG. 14, there is shown a block diagram of controller 640. Controller 640 controls the operation of the fluid distribution apparatus of the present invention Three independent computers operate in parallel within controller 640 to control distribution of the fluid to vehicle 10; video processor 600, X-axis controller 604, and Y-axis controller 606. System 640 is powered in a conventional manner by power supply 612.

Video processor 600 is a conventional video processor which may be provided by a Unidex II or a Unidex III, a unit from Aerotech, Inc. in Pittsburgh, Pennsylvania or the V2M-513 available from Advanced Interface Devices in Butler, Pennsylvania. Controllers 604,606 may also be provided by Unidex II or Unidex IIIa units from Aerotech or by Advanced Interface Devices as model MCM-33. Aerotech, Inc. provides servos which perform the functions of servos 614,616. Servos 614, 616 are also available from Advanced Interface Devices as the AID-8 and from Benshaw, Inc. in Allison, Pennsylvania.

Video processor 600 receives information on the profile of vehicle 10 from camera 12 and transmits this information by way of bus 626 to X-axis controller 604 and Y-axis controller 606.

X-axis controller 604 controls motor 72 which causes horizontal motion of tube 14 as previously described using conventional servo 614. Y-axis controller 606 controls motor 42 which causes vertical motion of tube 14 as previously described using conventional servo 616. Further information pertaining to processor 600 is available in "V2M-513 Product Bulletin" from Advanced Interface Devices which is herein incorporated by reference. Further information pertaining to controllers 604,606 is available in "MCM-33/MCN-33 Product Bulletin" which is herein incorporated by reference.

Each controller 600,602,604 in computer system 640 receive input from separate convention encoders in which rotation of an encoder shaft produces pulses at the output of the encoder permitting measurement of displacement. X-axis controller 604 receives pulses from encoder 618 by way of line 628 permitting X-axis controller 604 to determine the position of tube assembly 14 with respect to horizontal rails 64,66. Y-axis controller receives pulses from encoder 622 by way of line 34 permitting Y-axis controller to determine the vertical position of tube assembly 14 with respect to columns 36,37. Video processor 600 receives pulses from chain encoder 610 by way of line 620, permitting video processor 600 to determine the speed and position of a conveyor or track chain (not shown) which is coupled to vehicle 10 and pulls vehicle 10 through the fluid distribution apparatus of the present invention.

Output module 602 controls devices in the fluid distribution system by way of bus 648. Valve relays 128,130, which rotate tube assembly 14 as previously described, are controlled by output module 602 at block 87. The pump which forces fluid through tube assembly 14 is controlled at block 640. Valves 642 (not shown), which control the supply of fluid to tube assembly 14, are also controlled through output module 602 by way of bus 648. Other devices 646, which may include attraction lights or any other device desired, may also be controlled through output module 602.

Bus 648 of output module 602 may transmit up to 24 bits of control information. Each bit of information is latched within module 602. Each latch is driven by an open collector transistor whose base is controlled by way of bus 626.

Figure 15:
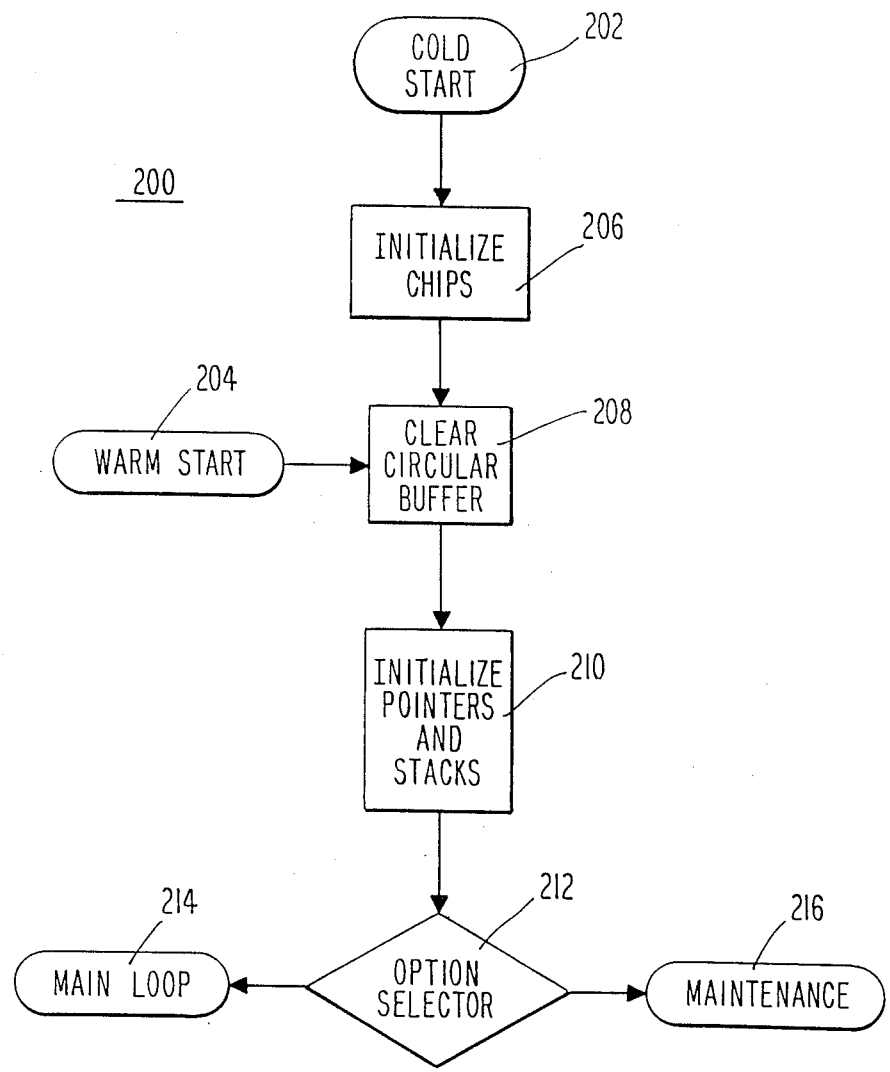
FIG. 15 is a flowchart representation of the initialization routine of the present invention.

Referring now to FIG. 15, there is shown a flow Referring chart representation of intialization routine 200 for the programs which control the operation of controller system 640. Routine 200, as well as the other routines to be described later, indicates the overall operation of system 640 and contains portions which may be executed by any one or group of processors 600, 604, 606 operating alone or in parallel.

When system 640 is first turned on, execution begins at cold start 202. Initialization of chips within processors 600, 604, 606 is performed as indicated in block 206. These initializations include conventional operations such as defining input/output ports on microprocessor chips and interface adapters When system 640 is halted and subsequently continued without powering down, execution proceeds through warm start 204. Regardless of whether system 640 is cold started through cold start 202 or warm started through warm start 204, a circular detect buffer containing profile information on vehicle 10 obtained when vehicle 10 passes in front of camera 12 is cleared in block 208.

Profile information on vehicle 10 is obtained by camera 12 in the form of a two-dimensional grid. The horizontal axis is divided into cells or intervals and a packet of information representative of the vertical height of vehicle 10 for each horizontal cell is produced by camera 12. Each value of height obtained by camera 12 is stored in a location of a circular detect buffer as vehicle 10 moves past camera 12 by moving around the circular buffer and writing over values of height which had previously been stored. When a space between two vehicles moves past camera 12a, packet of information representative of zero height is produced by camera 12.

Thus, each memory location in the circular buffer corresponds to a horizontal cell along the X-axis and contains vertical height information for the corresponding horizontal cell. The size of the circular buffer is chosen to permit a cell for which height information is stored in a given location in the circular buffer to be past tube assembly 14 before a new value of height is written into the location.

A plurality of pointers move around the detect circular buffer to indicate such parameters as the memory location corresponding to the horizontal cell passing in front of camera 12, the memory location corresponding to the horizontal cell in which tube assembly 14 is positioned, and the memory location corresponding to the horizontal cell positioned at the point at which vehicle 10 is acquired by the fluid distribution system of the present invention Additionally, several stacks are maintained by system 640. These stacks are required to store position information and other information transmitted between processors 600, 604, 606 by way of bus 626 and to store re-entry locations for subroutine calls. The pointers and stacks are initialized at block 210 whenever initialization routine 200 is executed.

Two options are provided within initialization routine 200 as shown at decision 212. The maintenance routine of terminal 216 is provided to permit tests of portions of system 640 such as chain encoders 610, 618, 622, motors 42, 72, and camera 12 among others. The main loop option shown in terminal 214 is selected for normal operation of the fluid distribution system of the present invention. These options may be selected by the operator by flipping an option select switch (not shown) within system 640.

Figure 16:
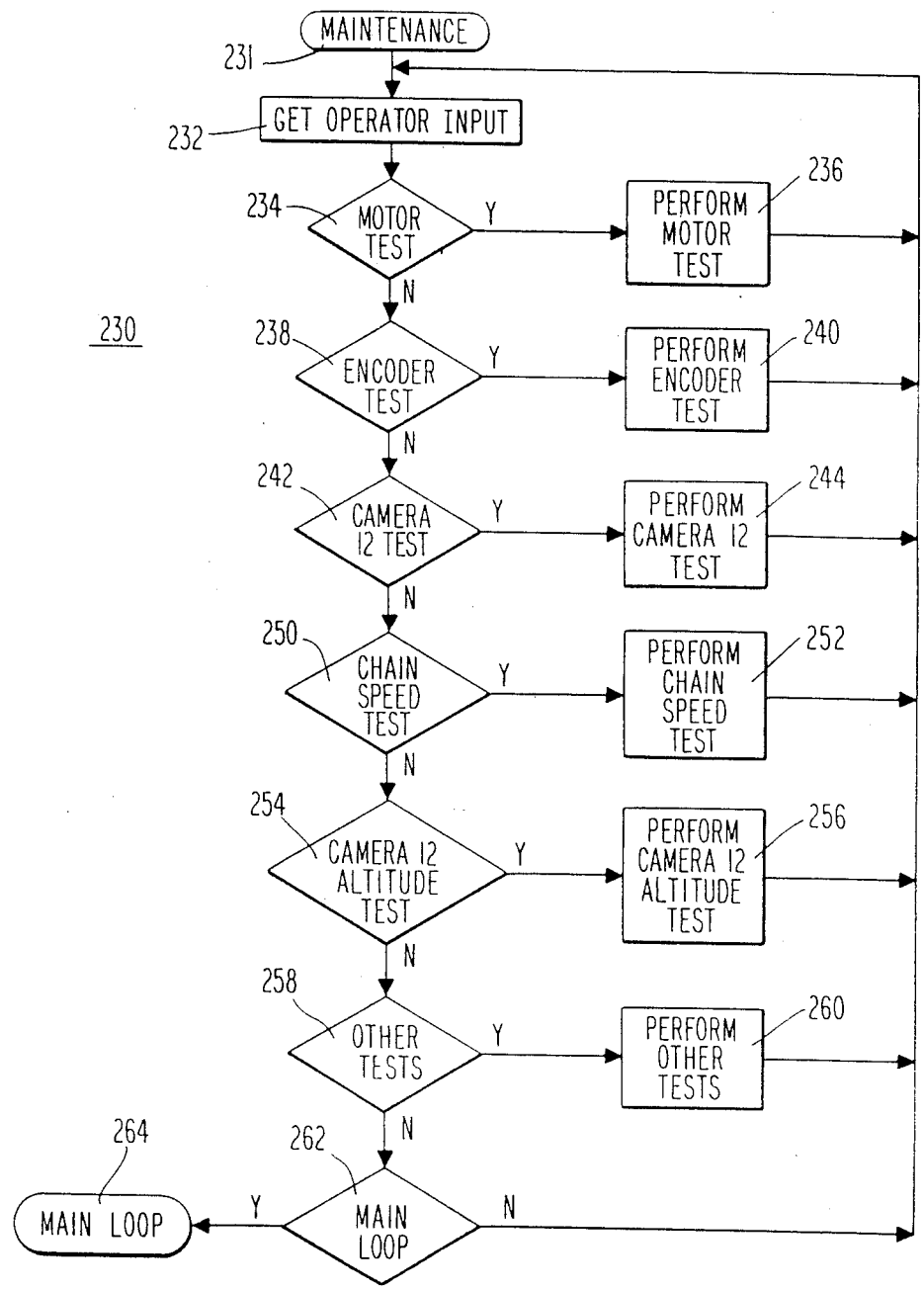
FIG. 16 is a flowchart representation of the maintenance routine of the present invention.

Referring now to FIG. 16, a flowchart of maintenance routine 230 is shown. Execution of maintenance routine 230 proceeds through maintenance start 231 to operator input block 232. When system 640 executes maintenance routine 230, the operator requests a desired test. At decision 234 system 640 determines whether the operator requested a motor test at operator input 232. If a motor test is requested as determined at decision 234 the motor test is performed at block 236. Motor test 236 includes transmitting commands to the motors to see whether they move tube assembly 14 as requested.

At decision 238 a determination is made whether an encoder test was requested by the operator. If a encoder test was requested the encoder test is performed at block 240. The encoder test includes receiving and displaying information representative of the pulses from encoder 610 to determine that the track chain is being monitored correctly.

Similarly a determination is made at decision 242 whether a test of camera 12 is requested The camera test is performed at block 244. It includes producing a binary display of the information received from camera 12.

Chain speed tests are performed at block 252 by processing the input by way of line 620 from chain encoder 610 when a chain speed test is requested as determined at decision 250. A test of the altitude of camera 12 is performed in block 256 if a determination is made at 254 that the operator has requested a camera altitude test. This test permits calibration of the vertical height of objects in front of camera 12.

At decision 258 a determination may be made whether various other user defined tests are to be performed These tests may then be performed at block 260.

Finally, an operator may select to enter the main loop. At decision 262 a determination is made whether the operator has requested entrance to the main loop routine and, if the determination is affirmative, execution proceeds to the main loop as indicated at terminal 264.

Figure 17:
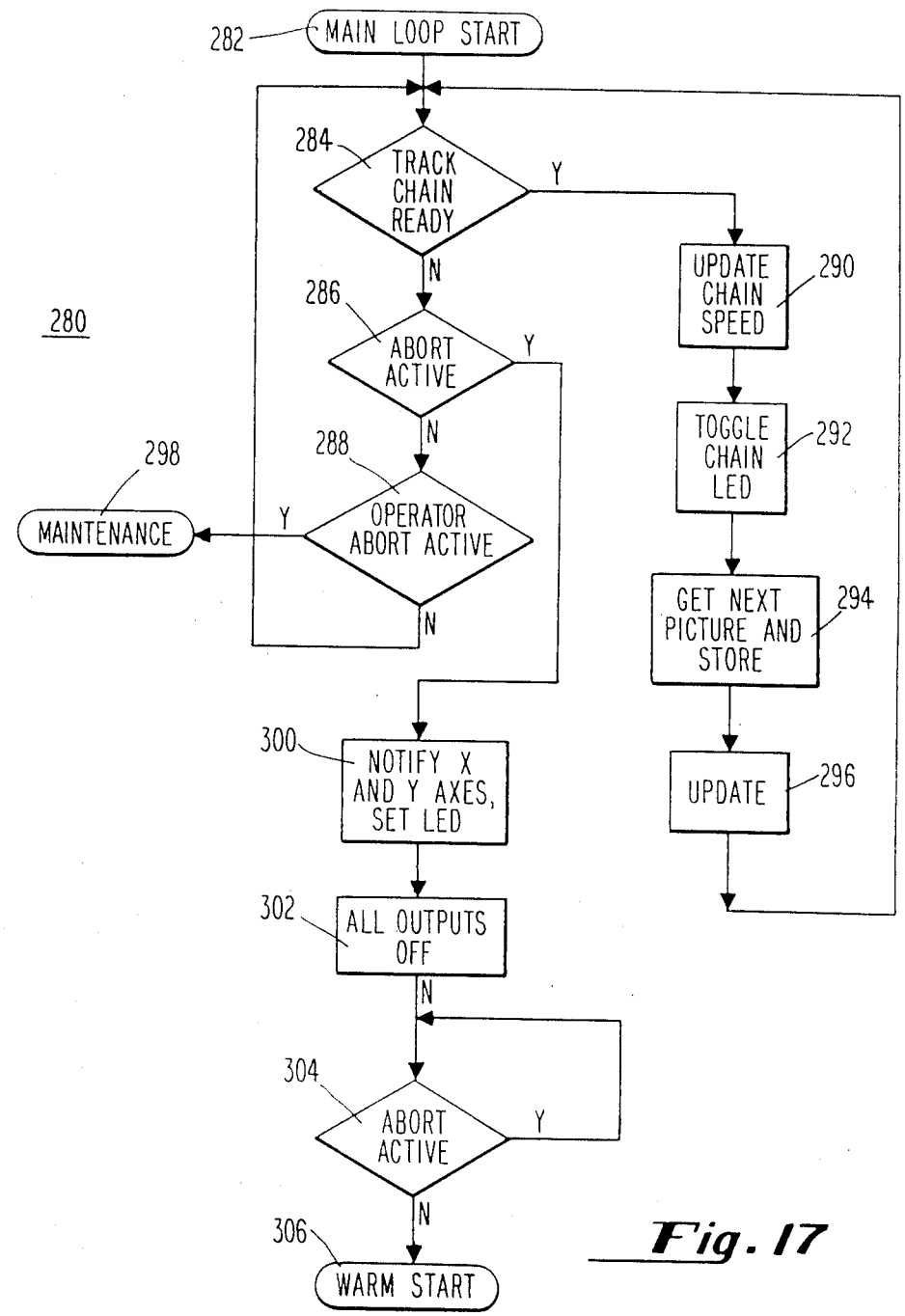
FIG. 17 is a flowchart representation of the main loop of the present invention.

Referring now to Figure 17, there is shown a flow chart representation of main loop routine 280. Main loop routine 280 may be entered from initialization routine 200 at terminal 214 or from maintenance routine 230 at terminal 264. In either case, execution of maintenance loop 280 begins at maintenance loop start 282. A determination is made at decision 284 whether the track chain which pulls vehicle 10 through the fluid distribution system of the present invention is ready. This determination is made by video processor 600 by counting the pulses received from chain encoder 610.

The pulses received from chain encoder 610 are representative of the length of track chain which has passed by chain encoder 610. The length of track chain is divided into cells or blocks as previously described in which the cell size may be selected by a user. Thus, a selected number of pulses from encoder 610 determine a horizontal cell. A typical cell size may be in the range of approximately three inches to six inches When the pulses received from chain encoder 610 indicate that a length of track chain equal to the selected cell size has passed since the last cell boundary, the YES path of decision 284 is followed.

At block 290 the track chain speed is updated. Video processor 600 has a timer (not shown) which enables it to determine the period of time which elapses between the crossing of cell boundaries The number of pulses received from chain encoder 610 is calibrated to permit video processor 600 to determine that a length of track chain corresponding to the cell size has passed during that elapsed time. Therefore, video processor 600 may determine the speed of the track chain.

The speed of the track chain is used by system 640 for, among other things, determining the relative position of tube assembly 14 with respect to vehicle 10 during reverse slewing in which vehicle 10 proceeds through the fluid distribution apparatus while tube assembly 14 travels above vehicle 10 in the opposite direction. At block 292 an LED is toggled at each cell boundary to permit an operator to determine, by viewing the LED, that the track chain is moving. A picture is then obtained from camera 12 at input 294. This picture may be any form of representation of the height of vehicle 10 within the horizontal cell in front of camera 12 at the time of the crossing of the cell boundary. In the preferred embodiment, camera 12 is a CCD camera which returns one kilobit of height information for each horizontal cell. Each bit corresponds to a vertical point in a range from substantially near the floor to substantially above the height of the largest vehicle 10 which may be washed by the fluid distribution apparatus of the present invention.

Eachh bit or each vertical point is either a one Each bit f or a zero depending on whether the view of that point from camera 12 is obstructed by vehicle 10. Thus, for example, if 0 represents an unobstructed vertical point and 1 represents an obstructed vertical point, the kilobit of information received from camera 12 contains all ones from the bit corresponding to the lowest point up to the bit corresponding to the maximum height of vehicle 10 in front of camera 12. The remaining bits are zero.

In the preferred embodiment, the one kilobit of information received from camera 12 is divided into 128 eight bit bytes, each byte representing a vertical cell. Each byte is then assigned either an on representation or an off representation depending on the number of bits within the byte which are 1 or 0. This permits system 640 to reject spurious bits of information received from camera 12. Thus the resolution, or vertical cell size, may be selected by selecting the size of such a group of bits which is assigned an on or off state. Furthermore, the light response characteristics of the output of camera 12 may be adjusted by selecting the number of bits within such a group of bits which must be on for the group of bits to be determined to be on.

The height value of vehicle 10 to be assigned to a horizontal cell is then determined by beginning at the topmost cell and proceeding downward until an obstructed cell is encountered This height value is then stored in the circular buffer location corresponding to the horizontal cell passing in front of camera 12.

When the track chain or conveyor which pulls vehicle 10 through the fluid distribution system first engages vehicle 10, vehicle 10 may lurch. If this lurch occurs while vehicle 10 is passing in front of camera 12 and camera 12 is obtaining height information, the height information transmitted by camera 12 may be distorted. This may result in inaccurate slewing and contouring. This problem may be solved by increasing the X-axis resolution by defining a smaller horizontal cell size.

Returning now to decision 284, if a determination is made that a horizontal cell boundary has not been passed since the last pass through main loop routine 280, system 640 makes a determination at decision 286 whether the abort is active. The abort active condition is raised by the safety features previously described. If tube assembly 14 makes contact with vehicle 10, tube 132 within tube assembly 14 is compressed to provide a signal indicating contact between tube assembly 14 and vehicle 10.

If the signal of tube 132 is present, as determined at decision 286, video processor 600 notifies X-axis controller 604 to terminate all horizontal movement of tube 14 as shown at block 300 and Y-axis controller 606 is programmed to move tube assembly 14 to the top of the fluid distribution system. Additionally an LED (not shown) on system 640 is lit to indicate that tube assembly 14 has made contact with vehicle 10. All outputs of output module 602 are turned off as shown in block 302 to permit operator intervention.

At decision 304 a determination is made whether the abort is still active. Execution continues to loop through decision 304 until the abort active condition is removed. When the abort active condition is removed, execution proceeds to a warm start as indicated at 306.

In addition to the automatic abort detected at decision 286, system 640 provides an operator abort at decision 288. For example, an operator may note that vehicle 10 has jumped off the track chain and desire to terminate operation. When the operator aborts, as determined at decision 288, execution proceeds to the maintenance routine shown at block 298.

If no aborts are present and the track chain is ready as determined at decision 284, the chain track speed is updated and the next picture is obtained from camera 12 as previously described. Execution then proceeds to the update routine as shown at update 296.

Figure 18:
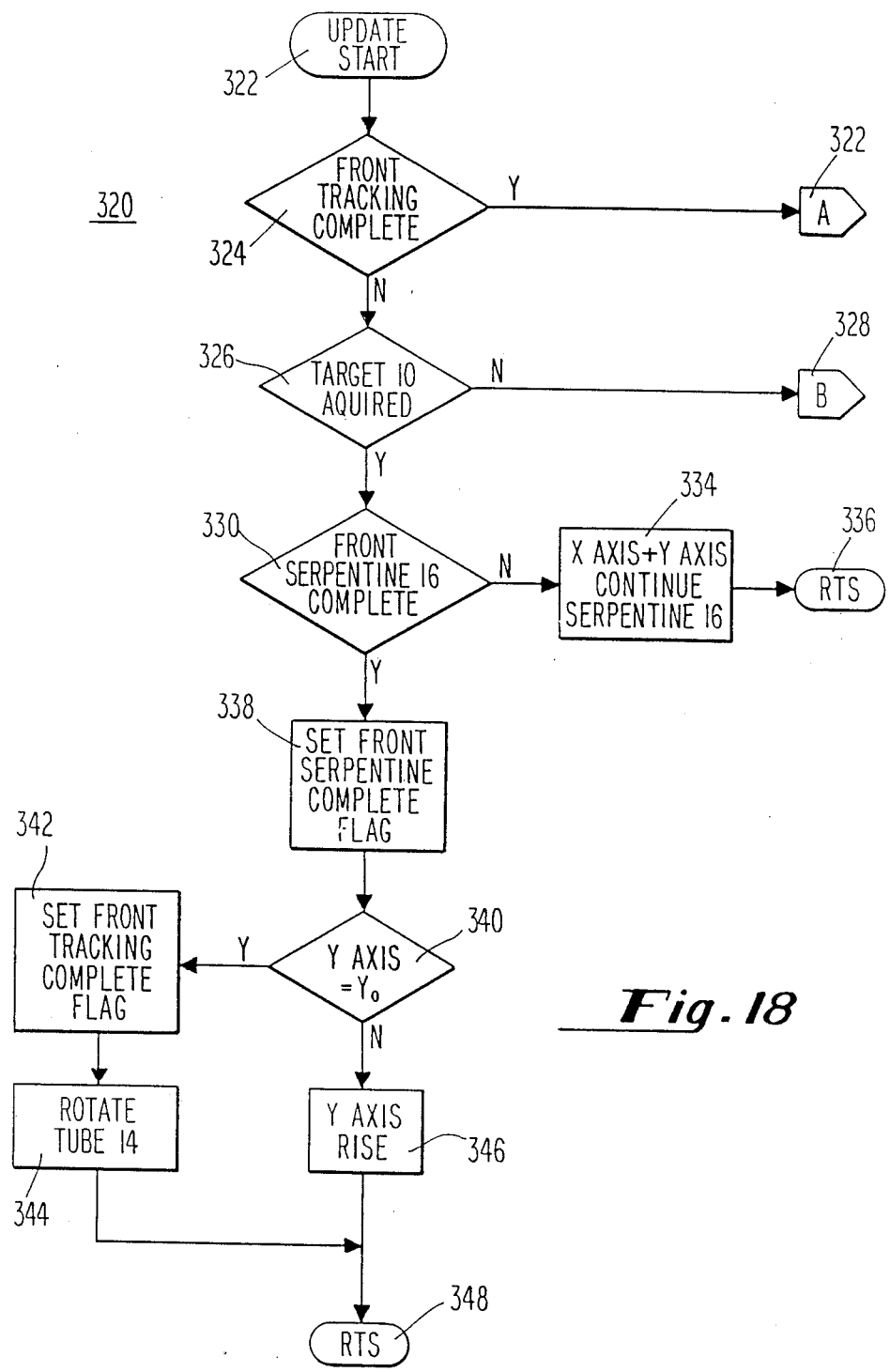
FIG. 18 is a flowchart representation of the front tracking routine of the present invention.
Figure 19:
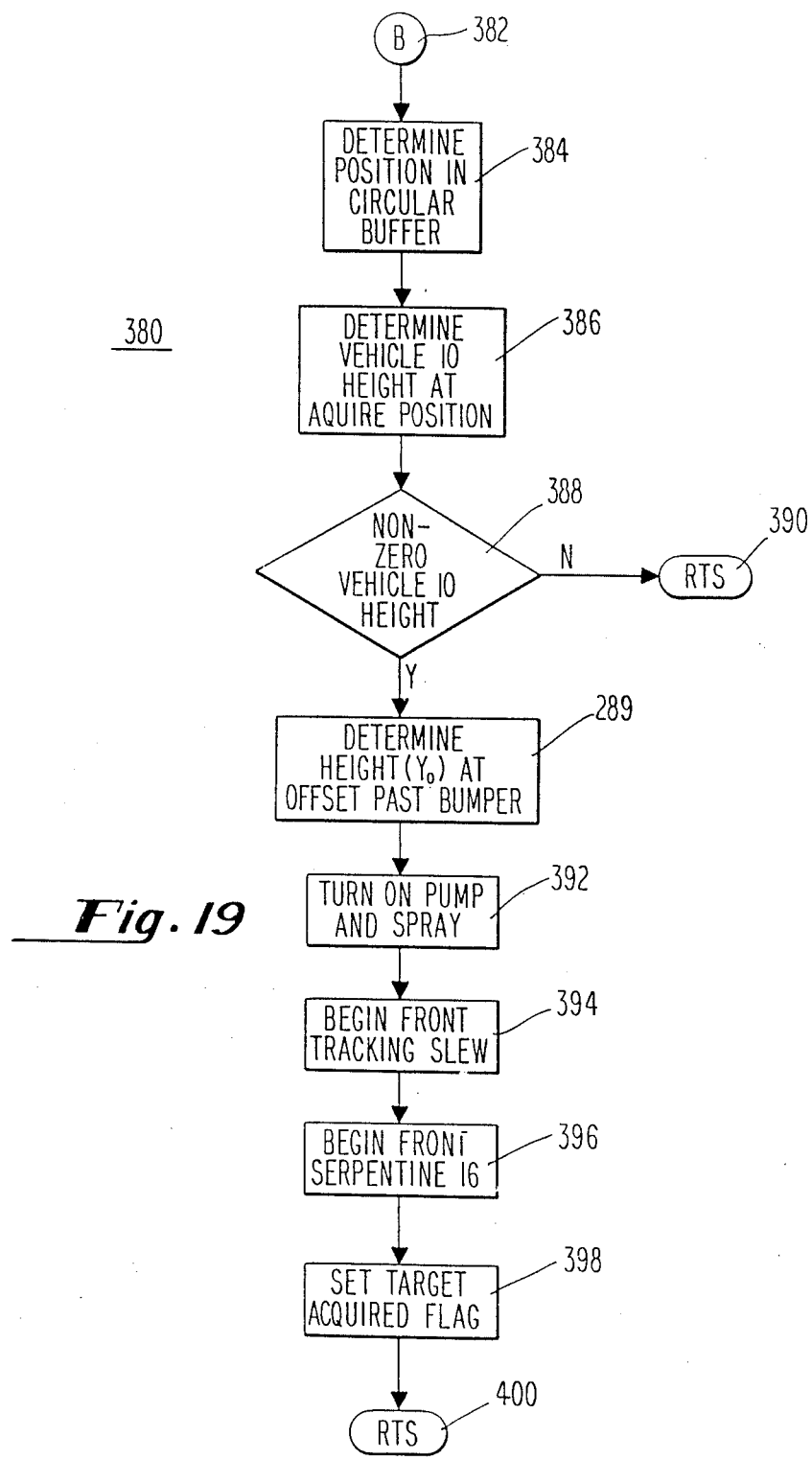
FIG. 19 is a flowchart representation of the acquire routine of the present invention.

Referring now to FIG. 18, a flowchart representation of front tracking routine 320 of the update routine is shown Front tracking routine 320 is entered at update start 322. At decision 324 a determination is made whether front tracking of vehicle 10 is complete. If front tracking is not complete, a determination is made at decision 326 whether a target has been acquired. Target acquisition occurs when the front end of vehicle 10 reaches a point which is a predetermined acquisition distance from tube assembly 14. If a target has not been acquired as determined at decision 326, execution proceeds through offpage connector 328 to onpage connector 382 of acquire routine 380 shown in FIG. 19.

In acquire routine 380 system 640 determines the memory location which corresponds to the current horizontal cell position of tube assembly 14. A tube location pointer pointing to this location within the circular buffer is maintained at all times. Thus as tube assembly 14 moves back and forth within the fluid distribution system, the tube location pointer moves around the circular buffer. Additionally, as the horizontal cells move through the fluid distribution system, as indicated to processor system 640 by the output of encoder 610 which monitors the movement of the track chain, the tube location pointer must be moved around the circular buffer even if tube 14 is not moving along the X-axis. This is so because the horizontal cells move with the track chain past stationary tube 14. When tube 14 moves simultaneously with the track chain, the location of the tube pointer in the buffer is a composite of the movement due to tube 14 translation and the movement due to advancement of the track chain.

A predetermined physical offset from the cell containing tube assembly 14 may be determined by an offset pointer positioned relative to tube location pointer. Thus, for example, if it is desired to acquire a vehicle 10 when vehicle 10 reaches a point two feet distant from tube assembly 14, and the size of the horizontal cells is chosen to be four inches, then acquisition occurs when the cell containing height information for the front most portion of vehicle 10 is offset six cells (or six times four inches) away from the cell pointed to by the tube location pointer.

During front tracking, an optimum distance is maintained between tube assembly 14 and vehicle 10. If tube assembly 14 is too far from vehicle 10, the fluid directed against the vehicle does not strike the surface of the vehicle with enough force to adequately clean the surface. If tube assembly 14 is too close to vehicle 10, the area of surface struck by the stream of fluid is too small because the stream spreads conically as it moves away from nozzles 28.

Because tube assembly 14 can horizontally track vehicle 10 from the acquisition point to the end of the fluid distribution system, the time during which tube assembly 14 dwells on the front of vehicle 10 is maximized. Likewise the dwell time of tube assembly 14 on the rear of vehicle 10 is maximized This results in better cleaning of vehicle 10 because usually the front and rear are the dirtiest regions. Furthermore, because X-axis controller 604 and Y-axis controller 606 permit tube assembly 14 to be positioned and maintained anywhere in the path of vehicle 10 dwell time in any region of the entire front or rear surface may be increased and fluid may be directed against particularly dirty regions of vehicle 10 for extended dwell times. For example, by maintaining the Y-axis coordinate constant at a level below the bumper, dwell time on the splash pan may be increased.

At block 386 a determination is made of the height information contained within the circular buffer for the cell corresponding to the acquire position which is at the predetermined offset from tube 14. If this height is zero, system 40 determines that there is no target which may be acquired at the acquire position and returns to main loop 280 at return 390. However if a determination is made at decision 388 that a non-zero vehicle height is present at the acquire position, execution proceeds to block 289 where a second height determination, $Y_o$, is made. $Y_o$ is the height of vehicle 10 a few cells beyond the first cell containing a non zero height information. This determination is made because the height at the acquire position may represent a bumper height rather than a hood height and therefore be a poor indication of the starting position required later for tube assembly 14 to pass over the top of vehicle 10.

Because a vehicle 10 is now acquired, the pump is turned on at block 392. Because tube assembly 14 is lowered substantially close to the floor of the fluid distribution system, the region of the front of vehicle 10 below the bumper may be washed when the pump is turned on.

The previously described oscillation of tube assembly 14 also begins at block 392. The oscillatory motion is important for complete cleaning of features of vehicle 10 which have horizontal and vertical surfaces, such as grills. If the angle of nozzles 28 is kept constant, fluid does not directly strike both the horizontal and vertical surfaces of such features regardless of the vertical motion of tube assembly 14.

At block 394 front tracking slew is begun. During front tracking, tube assembly 14 moves along the X-axis in the direction of movement of vehicle 10 as previously described and the front of vehicle 10 is washed. Front serpentine movement 16 of tube assembly 14 is begun at block 396. During this movement, tube assembly 14 moves along the Y-axis as previously described so that spray from tube assembly 14 may be distributed over the entire front of vehicle 10. Y-axis location information required to cause tube assembly 14 to follow the serpentine path is stored in Y-axis controller 606. The serpentine path is therefore a stored articulation In an alternate embodiment, this information may be stored in video processor 600 and be issued to Y-axis controller 606 as tube assembly 14 travels along the X-axis. However, this method makes inefficient use of bus 626. The target acquired flag is set at block 398 and execution returns to main loop 280 at return 400.

On the next pass through update routine 320, the YES path at decision 326 is followed because the target acquired flag is set. A determination is then made at decision 330 whether the front serpentine motion of tube assembly 14 is complete If front serpentine motion 16 is not complete, the X-axis and Y-axis serpentine motion continue as shown at block 334.

To cause to be assembly 14 to continue following serpentine motion 16, video processor 600 issues an X coordinate to X-axis controller 604 by way of bus 626 while Y-axis controller 606 continues to follow the stored articulation of the serpentine path. The X coordinate issued to X-axis controller 604 from video processor 600 is selected to maintain the X coordinate of tube assembly 14 at the constant predetermined acquisition distance from the cell corresponding to the location of the first non-zero height of vehicle 10 in the circular buffer. The X coordinate is selected in accordance with the output of encoder 610 which indicates the movement of the track chain and thereby the movement of the first cell with a non-zero height. Thus if the first non-zero height of vehicle 10 advances, for example, five horizontal cells, as indicted by the output of encoder 610, the X-axis coordinate of tube assembly 14 is also advanced five horizontal cells causing tube 14 assembly to lead the front of vehicle 10 by a predetermined constant distance.

Figure 22A:
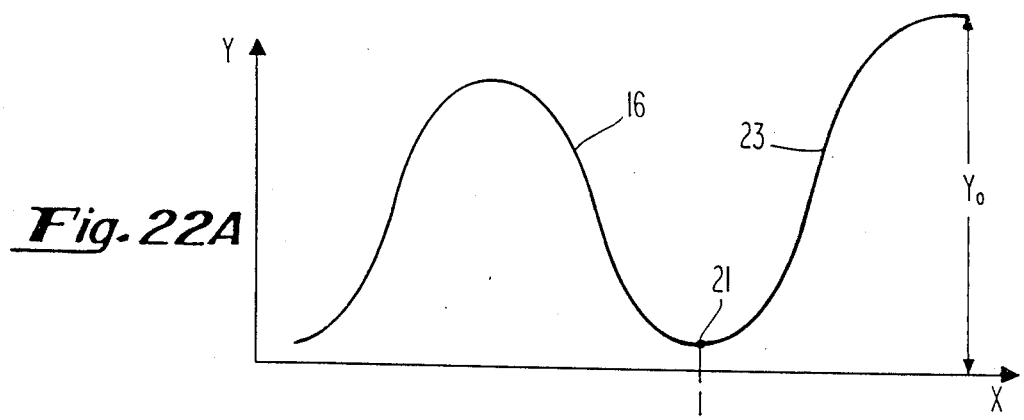
FIGS. 22A–C are graphical representations of the path of the spray tube assembly of the present invention.
Figure 22B:
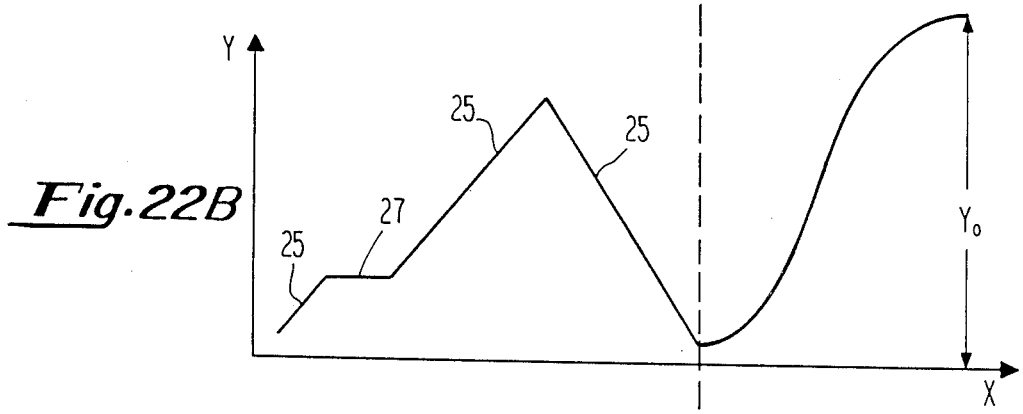
Figure 22C:
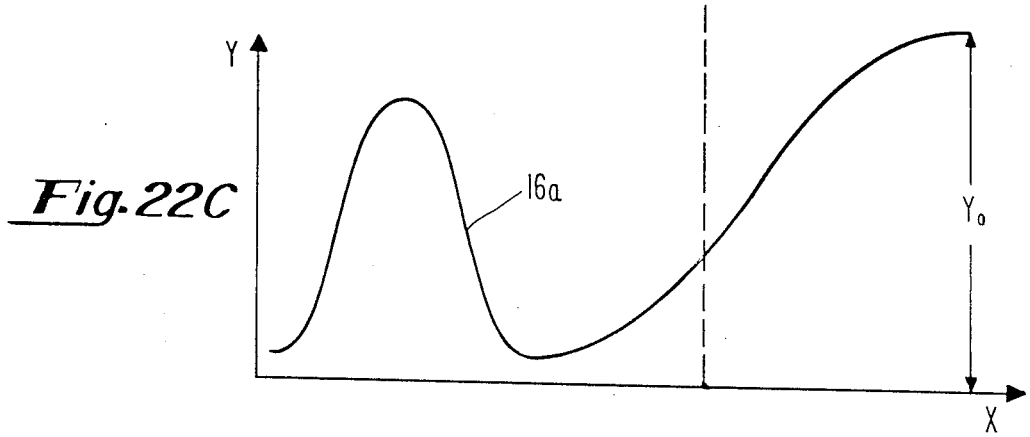

The path followed by tube assembly 14 need not be serpentine. For example, tube 14 may ramp upward and downward as shown in FIG. 22B in which ramps 25 are stored articulations of tube 14. Furthermore, the Y-axis coordinate of tube assembly 14 may be held constant for a portion of X-axis travel as shown at level 27. Additionally, the X-axis length of a stored articulation may be varied as shown in FIG. 20C in which serpentine path 16a is of a shorter length than serpentine path 16.

Thus tube assembly 14 may follow a non-linear path, such as path 16, while maintaining a constant horizontal distance from the front of vehicle 10. Because the track chains may be run at varying speeds, this is accomplished by maintaining the horizontal component of the velocity of tube assembly 14 equal to the speed at which vehicle 10 moves through the system in accordance with the output of encoder 610. Displacement of tube assembly 14 in the vertical direction, in accordance with the stored articulation, must therefore be non-linear with respect to time, causing tube 14 to follow a serpentine path.

In an alternate embodiment, tube assembly 14 may front track vehicle 10 at an increasing or decreasing distance by moving tube assembly 14 somewhat faster or somewhat slower than the movement of vehicle 10 in the horizontal direction This may be accomplished by increasing or decreasing the offset between the tube location pointer and the first non-zero height during front tracking.

Both X-axis controller 604 and Y-axis controller 606 contain conventional algorithms required to move head 24 and tube assembly 14 to the X and Y-axis coordinates issued by processor 600 or stored within Y-axis controller 606. These algorithms take into consideration such factors as acceleration, deceleration, and various time lags.

It will be understood by those skilled in the pertinent fields of art that such algorithms are conventionally used in applications such as servo positioning systems and numerical controllers. Information describing how to build servo positioning systems is available in "Digital and Analog Controls" by Needler and Baker, ISBN 0-8359-1314-7, Reston Publishing Company, 1985, which is incorporated herein by reference.

When the front serpentine motion is complete, as determined at decision 330, a front serpentine complete flag is set in block 338. However, the serpentine path may be complete before tube assembly 14 reaches the end of its horizontal travel during front tracking, as shown in FIG. 22A, in which the front serpentine complete flag is set at point 21 and tube assembly 14 continues to follow path 23 in order to be in position to begin reverse slew and contouring.

Therefore, a determination is made at decision 340 whether the position of tube assembly 14 along the Y-axis is equal to $Y_o$ in which $Y_o$ is the starting height of tube assembly 14 for the reverse slew and contouring over vehicle 10. If the Y-axis coordinate of tube assembly 14 has not reached $Y_o$, tube assembly 14 continues to rise along the Y-axis following path 23.

If the Y-axis coordinate of tube assembly 14 has reached $Y_o$, the front tracking complete flag is set in block 342 and tube assembly 14, which sprays in the direction opposite the travel of vehicle 10 during the front tracking, is rotated to spray downward during the reverse slew and contouring by way of bus 648 of output module 602 as previously described. Relay 128 of control circuitry 102 is activated at block 344 to rotate tube assembly 14 to spray downward as previously described. Execution then returns to main loop 280 through return 348. On the next pass through routine 320 the YES path of decision 324 is followed because the front tracking complete flag is set and execution proceeds through offpage connector 332.

Figure 20:
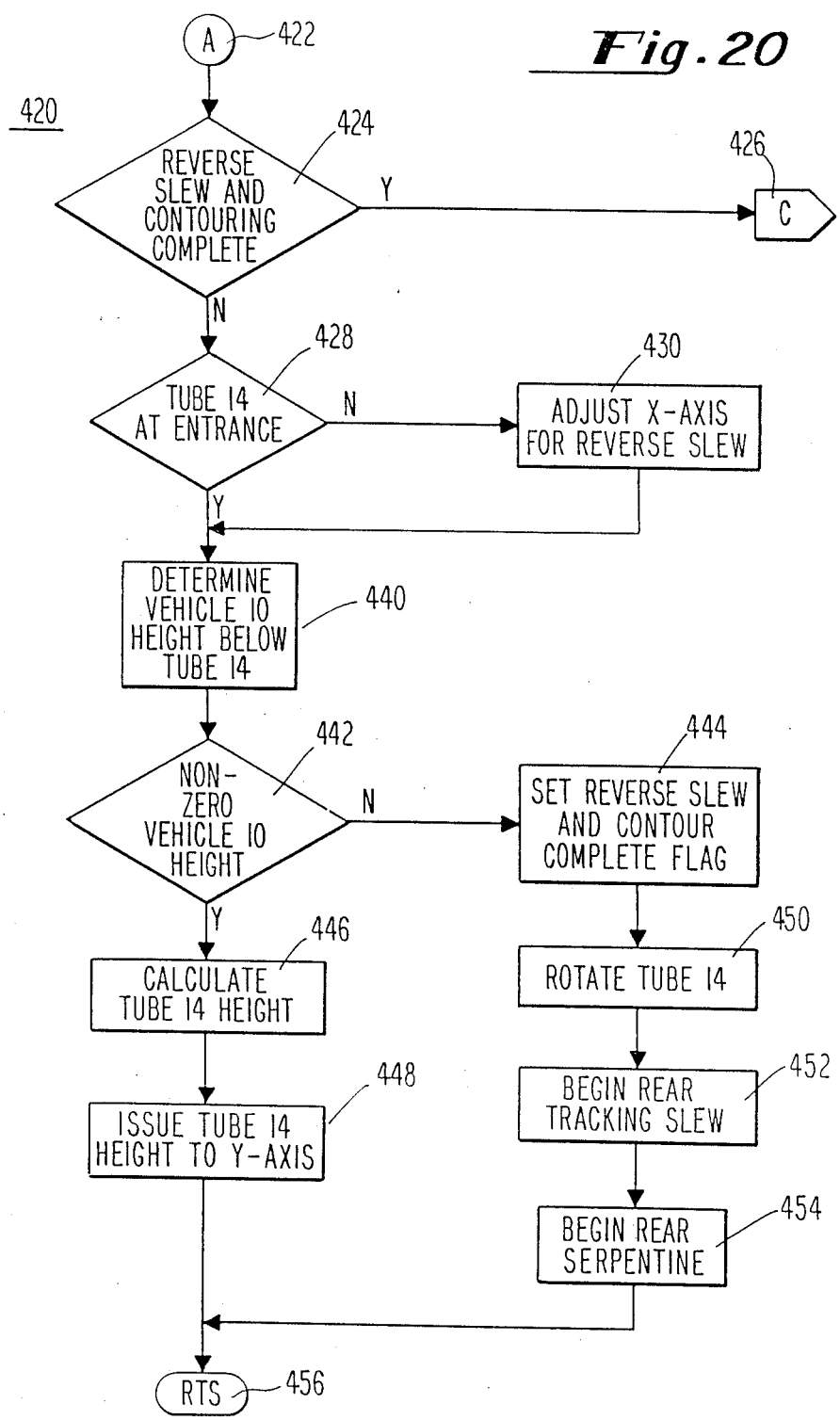
FIG. 20 is a flowchart representation of the reverse slew and contouring routine of the present invention.

Referring now to FIG. 20, a flow chart representation of reverse slew and contouring routine 420 is shown. Execution proceeds to onpage connector 422 of routine 420 when front tracking is complete. A determination is made at decision 424 whether reverse slew and contouring are complete. If reverse slew and contouring are not complete as determined at decision 424, a determination is made at decision 428 whether tube assembly 14 has slewed all the way to the entrance of the fluid distribution apparatus.

If tube assembly 14 has not reached the entrance, video processor 600 causes the X-axis of tube 14 to be adjusted to continue the reverse slew. To continue this reverse slew, which is in the direction opposite the motion of vehicle 10, video processor 600 issues an X-axis coordinate by way of bus 626 to X-axis controller 604 as previously described X-axis controller 604, upon receiving the X coordinate from video processor 600 by way of bus 626, moves tube 14 toward the entrance. When adjusting the X-axis of tube 14 during reverse slew, video processor 600 must compensate for the travel of vehicle 10 to keep track of the relative position of vehicle 10 and tube 14. Thus the tube location pointer in the circular buffer is adjusted in one direction for the reverse slew horizontal movement in the opposite direction for the opposite movement of the track chain as determined from the output of encoder 610. The position of the pointer is thus a composite of these two pieces of information.

Contouring of vehicle 10 may continue after the reverse slew is complete In this situation, tube 14 has reached the entrance of the fluid distribution system and is positioned at the entrance and no further movement along the X-axis occurs while contouring is completed. Tube assembly 14 continues to move up and down along the Y-axis as necessary to contour vehicle 10 while vehicle 10 is pulled along the X-axis beneath tube 14 by the track chain.

At block 440 a determination is made of the height of vehicle 10 below tube assembly 14. This height is determined by reading a value from the circular buffer as previously described. Video processor 600, using the tube location pointer, determines in which horizontal cell tube assembly 14 is currently positioned and reads the height information from the corresponding location within the circular buffer. Alternately, the height information of a location which is offset from the tube location pointer within the circular buffer may be read to allow height determinations to lead vehicle 10 by a predetermined number of horizontal cells.

At decision 442 a determination is made whether the height of vehicle 10 read in block 440 is a non-zero height. If the height is non-zero, tube assembly 14 is still above a portion of vehicle 10 and a calculation of tube height is performed in block 446 by adding a predetermined margin to the height information determined in block 440 to cause tube assembly 14 to remain a constant predetermined distance above the upper surface of vehicle 10.

The margin added in block 446 is preferably in the range of one to four feet to assure that fluid strikes the surface of vehicle 10 with sufficient force to clean vehicle 10 while leaving a safety margin to prevent tube assembly 14 from contacting vehicle 10. Tube height is issued to Y-axis controller 606 at block 448 to cause tube 14 to be raised or lowered to the correct height for the current horizontal cell thereby causing tube 14 to follow the contour of vehicle 10. Execution then returns to main loop 280 by return 456.

If a determination is made at decision 442 that the height of vehicle 10 below tube assembly 14 is zero, then vehicle 10 is no longer underneath tube assembly 14 and reverse slew and contour is complete Therefore, the reverse slew and contour complete flag is set in block 444 and tube assembly 14, which sprays downward during reverse and contour, is rotated in block 450 to spray in the direction of travel of vehicle 10 to permit washing of the rear of vehicle 10 during rear tracking.

In block 452 rear tracking slew is begun by video processor 600 issuing an coordinate to X-axis controller 604 in which the X coordinate is chosen to position tube assembly 14 a predetermined distance from the rear of vehicle 10. This position is determined in a manner similar to that described for determining the front tracking position previously described The location within the circular buffer corresponding to the last non zero height of vehicle 10 is offset by the number of memory locations corresponding to the predetermined rear tracking distance and the X-axis coordinate of tube assembly 14 is chosen to correspond to this offset location. This offset is in the direction opposite that of the offset for front tracking of vehicle 10. Tube assembly 14 is thus positioned at the cell determined in this manner and this position is issued to X-axis controller 604.

Rear serpentine motion of tube assembly 14 is begun at block 454. Rear serpentine path 20 is produced in the same manner as front serpentine path 16 previously described in which Y-axis controller 606 causes tube 14 to move along the Y-axis and follow a predetermined path as the X-axis coordinate of tube assembly 14 tracks the rear of vehicle 10. Rear 20 serpentine path may be the same as front serpentine path 16 or it may be a mirror image of the serpentine path 16 or any other desired path stored in system 640.

The next time that reverse slew and contouring routine 420 is executed, the YES path of decision 424 is followed because the reverse slew and contour complete flag is set causing execution to proceed through offpage connector 426.

Figure 21:
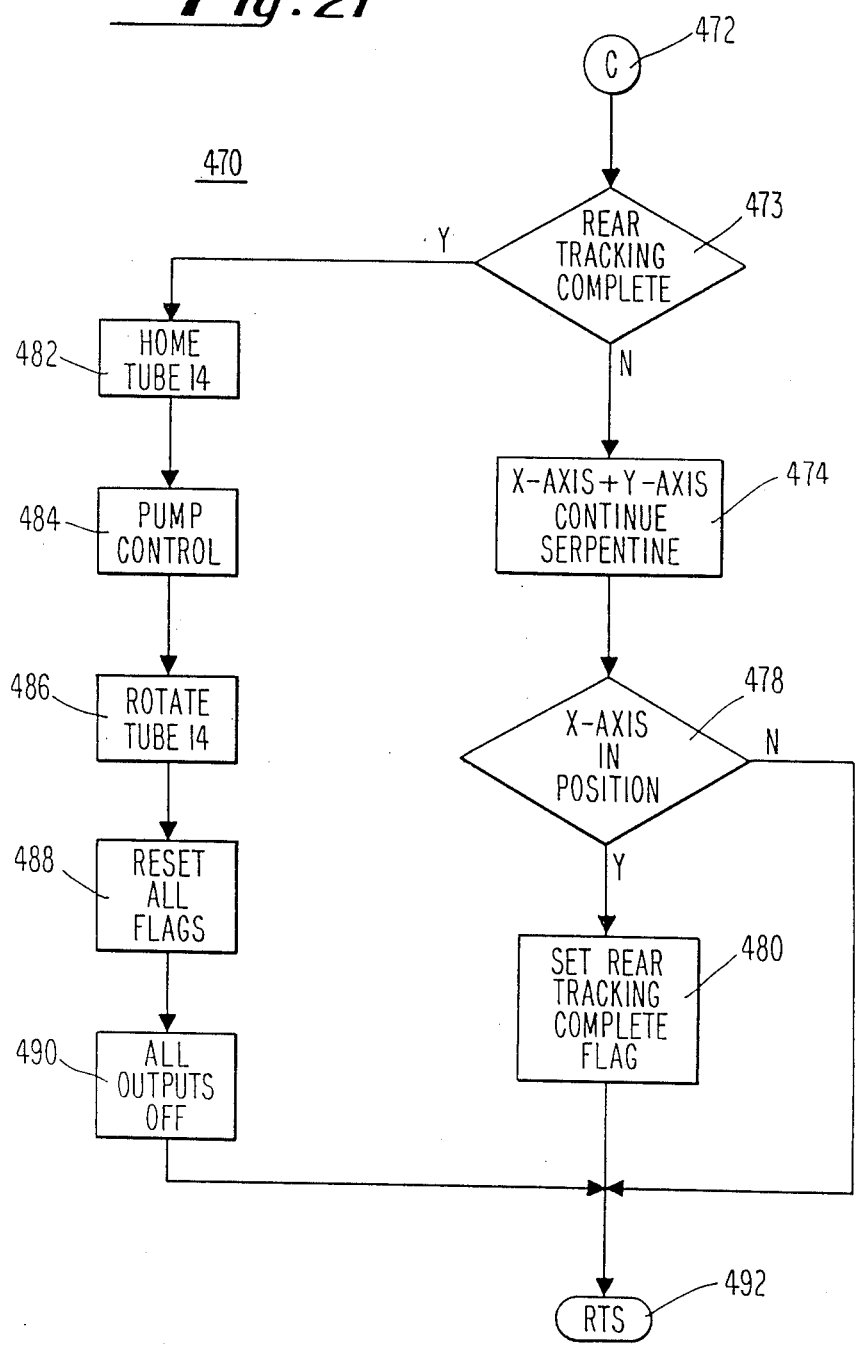
FIG. 21 is a flowchart representation of the rear tracking routine of the present invention.

Referring now to FIG. 21, a flow chart representation of rear tracking routine 470 is shown. Execution enters rear tracking routine 470 through on page connector 472 when reverse slew and contour is complete. At decision 473 a determination is made whether rear tracking is complete. If rear tracking is not complete, the X-axis and Y-axis of tube assembly 14 are adjusted in block 474 to cause tube assembly 14 to continue following serpentine path 20 as previously described while maintaining the predetermined tracking distance between tube 14 and the rear of vehicle 10.

At decision 478 a determination is made whether tube assembly 14 has reached its end of tracking position. This is the position at which the fluid distribution system is finished spraying vehicle 10 and it is substantially the position at which tube 14 is positioned to acquire the next vehicle. If tube assembly 14 has not reached this position, execution returns to main loop routine 280 by way of return 492. If tube assembly 14 is in position, the rear tracking complete flag is set in block 480.

During the next execution of rear tracking routine 470, the YES path of decision 473 is followed because the rear tracking complete flag is set. When the rear tracking is complete, tube assembly 14 is homed in block 482 and the pump providing fluid to tube assembly 14 is turned off at block 484. Tube assembly 14, which faces the direction of travel of vehicle 10 during rear tracking, is rotated to face the direction opposite vehicle travel to be in position to wash the front of the next vehicle in block 486. All flags are reset in block 488 and all outputs of output module 602 are turned off in block 490.

FIGS. 8, 9 and 10 illustrate three other arrangements for moving tube assembly 14 and controlling the sectors over which fluid is sprayed by the tube assembly. In FIG. 8, movable housing 24 and tube assembly 14 undergo only vertical movement as a vehicle approaches, passes under and leaves the tube assembly. The same mechanisms illustrated in FIGS. 2, 3, 4 and 5 can be used to orient the tube assembly and move the tube assembly vertically to follow the profile of the vehicle being cleaned.

In FIG. 9, a parallelogram linkage 133, controlled by a hydraulic cylinder 134, raises and lowers movable housing 24 and tube assembly 14, with only an incidental horizontal component of movement The same mechanism illustrated in FIGS. 2,3,4 and 5 can be used to orient and oscillate the tube assembly.

In FIG. 10, movable housing 24 and tube assembly 14 undergo both pivotal movement and radial movement. These movements are represented by arrows 135 and 136, respectively. Simultaneously, the tube assembly is moved between selected angular positions.

Figure 11:
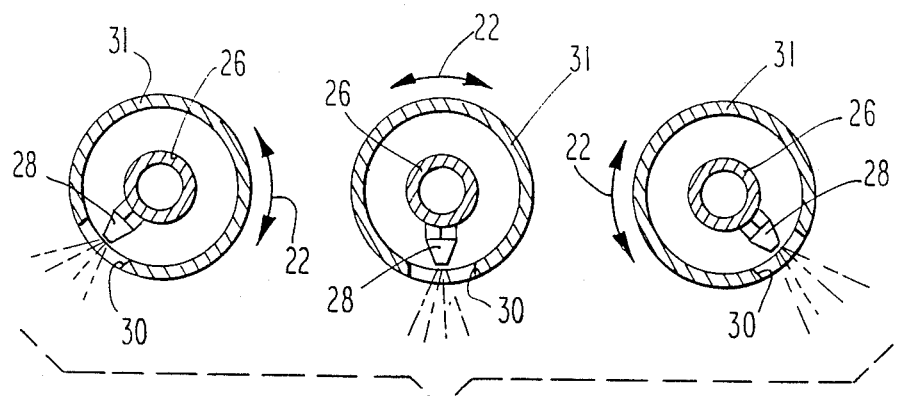
FIG. 11 illustrates the three positions of a vertically disposed spray tube assembly incorporated in an alternate embodiment of the present invention.

FIG. 11 illustrates three positions of the tube assembly when oriented vertically and held in a fixed position relative to the movement of a vehicle being cleaned. In this arrangement, one tube assembly would be positioned on each side of the vehicle. As the vehicle approaches, passes and leaves the tube assemblies, the tube assemblies are moved into selected angular positions about which they are oscillated.

Figure 12:
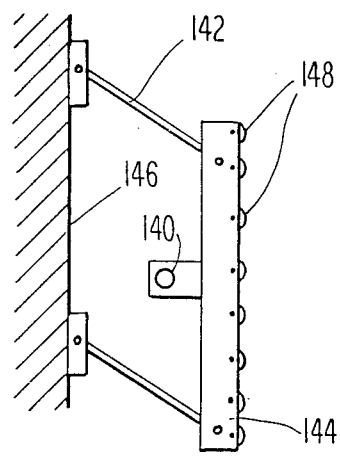
FIGS. 12,13 are schematic diagrams of alternate embodiments of the present invention in which the spray tube assembly is disposed vertically.
Figure 13:
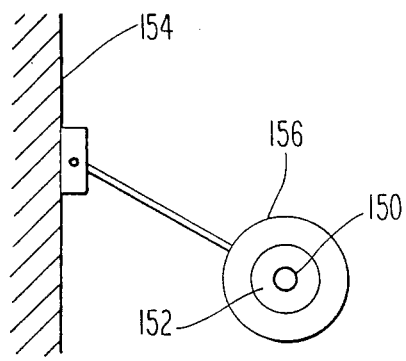

In FIG. 12, a vertically disposed spray tube 140 is carried by a parallelegram linkage 142 which has as one of its components a spacer 144. As a vehicle approaches the spray tube, the vehicle hits spacer 144 and moves the spacer and spray 140 toward a supporting wall 146. Spacer 144 carries a plurality of rollers 148 which bear against the vehicle as it passes. Spray tube 140 is rotated to selected angular positions and oscillated at the selected angular positions in a manner similar to that already described. Parallelogram linkages are used commonly in vehicle washing systems, and, therefore, are known to those skilled in this art. In FIG. 13, a vertically disposed spray tube 150 is carried by an assembly 152 pivotally mounted on a supporting wall 154. Assembly 152, which includes a freely rotating wheel 156, is moved toward supporting wall 154 as a vehicle hits wheel 156 to space spray tube 150 from the vehicle as the vehicle passes the spray tube. Spray tube 150 is rotated to selected angular positions and oscillated at the selected angular positions in a manner similar to that already described.

Figure 23A:
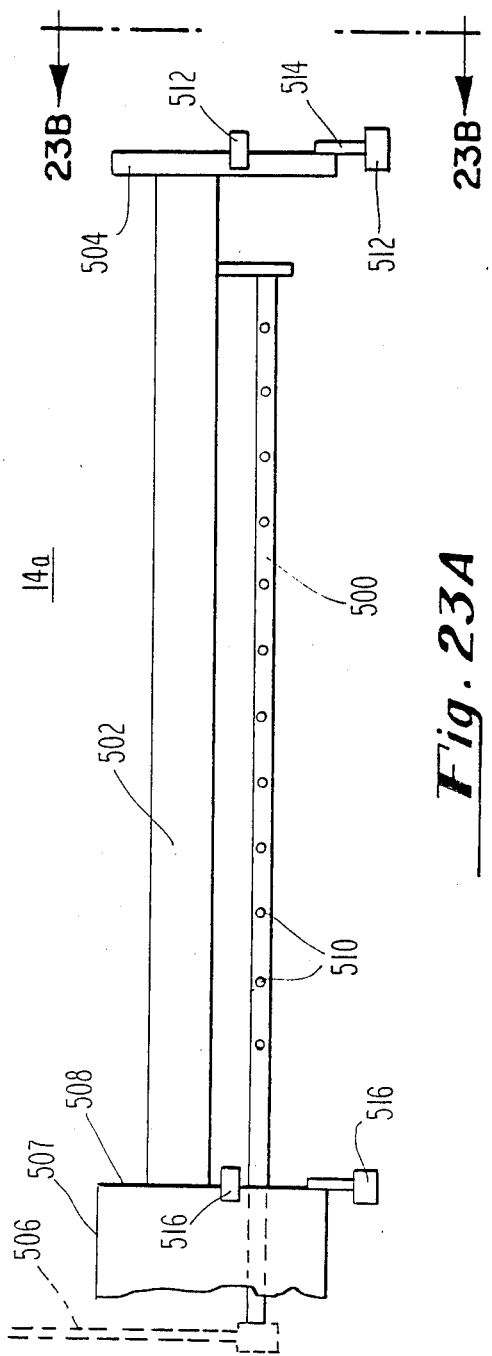
FIGS. 23A and 23B are schematic diagrams of alternate embodiments of the spray tube assembly portion of the present invention.
Figure 23B:
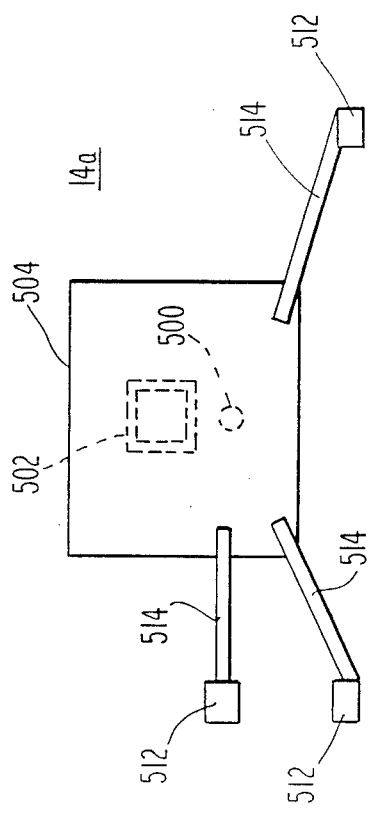

Referring now to FIG. 23A,B there is shown tube assembly 14a which is an alternate embodiment of tube assembly 14, FIG. 6. Tube assembly 14a includes rinse bar 500 for distributing fluid over a vehicle 10. Rinse bar 500 is provided with water line 506 for supplying fluid to rinse bar 500 and with nozzles 510 for spraying the fluid over a vehicle. The outer diameter of rinse bar 500 may be approximately seven-eighths of an inch.

Movable carriage housing 507 supports tube assembly 14a and moves along vertical columns as previously described. Tubular support bar 502 extends from housing 507 and supports rinse bar 500 as well as end plate 504. Support bar 502 may be formed of aluminum and extend a length of eight feet and be approximately two inches by four inches with a one-eighth inch wall. Support bars 514 are attached to end plate 504 and support, at the end opposite the attachment, light sources 512. Light sources 512 light beams which travel parallel to rinse bar 500 and strike receivers 516. Receivers 516 extend from plate 508 of carriage housing 507 similar to the manner in which light sources 512 extend from end plate 504. Receivers 516 are positioned to be in line with light sources 514 causing receivers 512 and receivers 516 to straddle a vehicle 10 and causing the light beams to be interrupted when a vehicle 10 gets within a predetermined distance of rinse bar 500.

Light sources 512 extend approximately 13 inches in front of or behind the center of plate 504. Uppermost light source 512 is positioned to be approximately level with rinse bar 500 and lowermost light sources 512 are positioned to be approximately 12 inches below uppermost light source 512.

The output of each receiver 516 indicates whether the light beam striking the individual receiver 516 is broken. The outputs of the plurality of receivers 516 are OR'ed such that the interruption of any one of the beams received by receivers 516 raises the beam interrupt condition. In an alternate embodiment (not shown), sonar devices rather than light sources 512 and receivers 516 may be used to determine when tube assembly 14a is positioned at a predetermined distance from vehicle 10.

Figure 24:
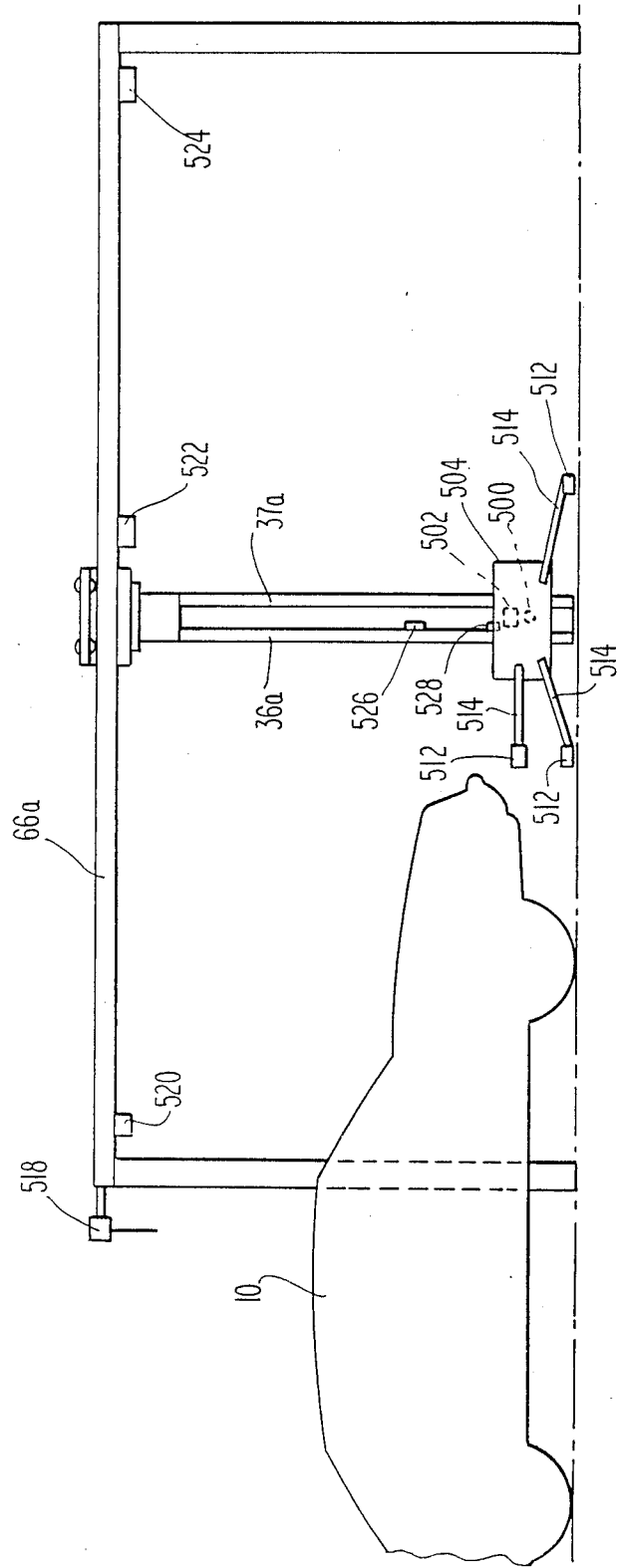
FIG. 24 illustrates the fluid distribution apparatus of the present invention constructed to use the tube assembly of FIGS. 23A and 23B.

Referring now to FIG. 24, there is shown the preferred embodiment of the fluid distribution system of the present invention, in which tube assembly 14a distributes fluid to vehicle 10 and light sources 512 and receivers 516, along with a plurality of limit switches, permit tube assembly 14a to track and contour vehicle 10. In this embodiment, as previously described for the embodiment of FIGS. 1A, 1B and 1C, tube assembly 14a acquires vehicle 10, tracks and cleans the front of vehicle 10 while moving in the direction of motion of vehicle 10, travels in the direction opposite the direction of motion of vehicle 10 while contouring and cleaning the upper surfaces of vehicle 10, and then tracks and cleans the rear of vehicle 10 while moving in the direction of motion of vehicle 10.

Figure 25A:
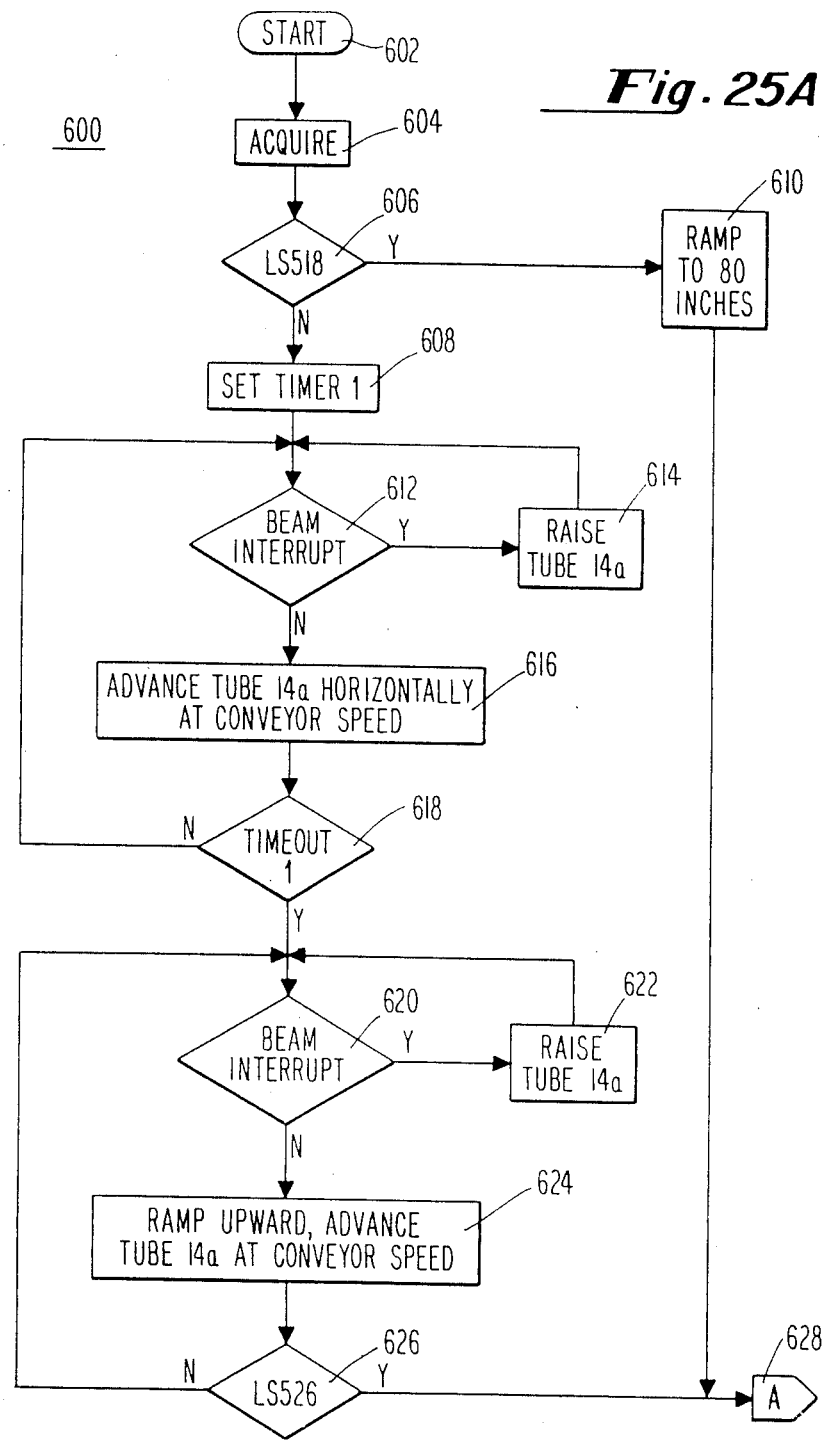
FIGS. 25A and 25B are flow chart representations of a front tracking routine of the present invention.
Figure 25B:
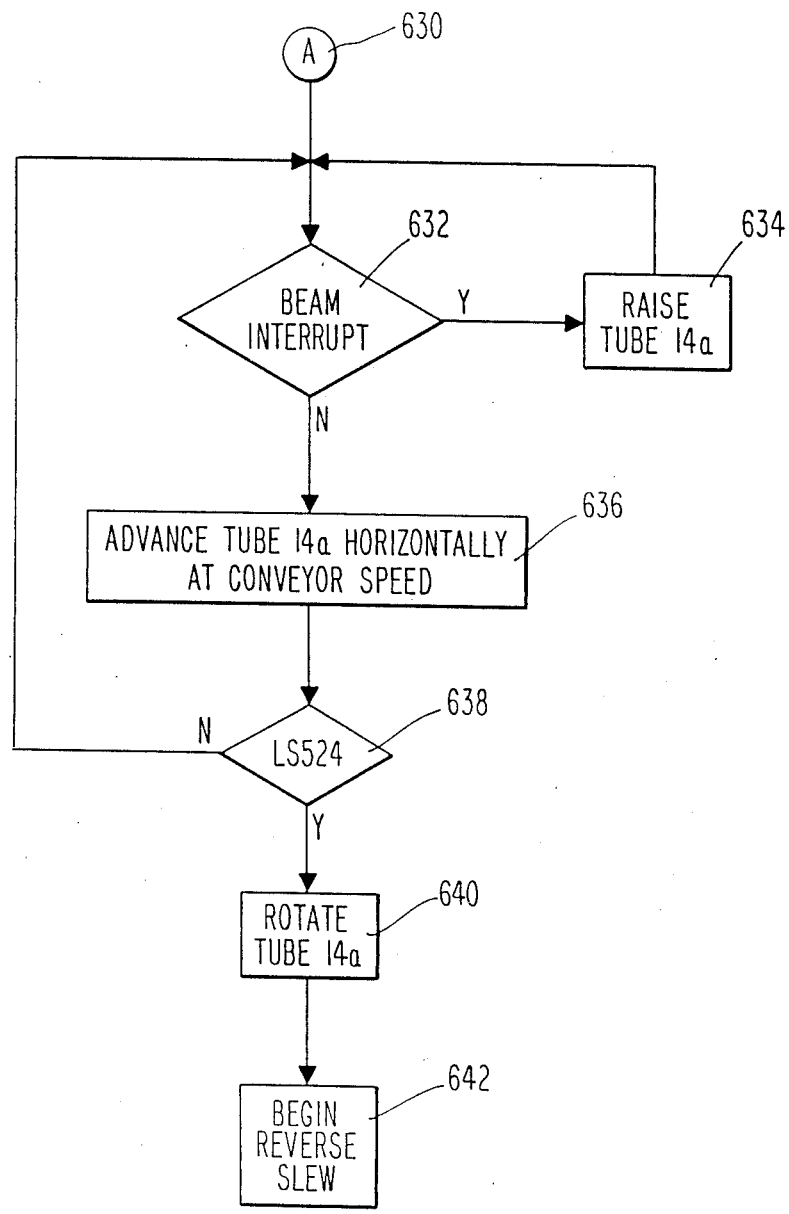

Referring now to FIGS. 25A, 25B, there is shown front tracking routine 600 for tracking the front of a vehicle 10 using light sources 512 and receivers 516. Front tracking routine 600 starts at start terminal 602 and acquires vehicle 10 at block 604. At decision 606 a determination is made whether limit switch 518 extending downward from horizontal support rail 66a has been hit. If limit switch 518 has been hit, a large vehicle, such as a van or a truck, is indicated and special steps must be taken to prevent tube assembly 14a from striking the top of vehicle 10 when reverse slewing is begun. If limit switch 518 has not been hit, as determined at decision 606, execution proceeds to block 608 in which timer 1 is set.

Timer 1 has a duration of approximately 2-3 seconds, and is selected to permit vehicle 10 to travel approximately two feet before timer 1 expires.

During the time that timer 1 is running a determination is made whether any of the light beams produced by light sources 512 are interrupted. Such an interruption could indicate that vehicle 10 is about to hit tube assembly 14a. To prevent vehicle 10 from striking tube assembly 14a tube assembly 14a is raised until all light beams are reestablished. Thus a determination is made at decision 612 whether any beam is interrupted. If any one of the beams is interrupted, tube assembly 14a is raised in block 614 and a determination is again made at decision 612 whether any beams are interrupted. Thus execution continues to loop through decision 612 and block 614 until all beams are reestablished.

If no beams are interrupted, as determined at decision 612, tube assembly 14a is advanced horizontally at the conveyor speed in front of vehicle 10 as shown in block 616. By tying the horizontal speed of tube assembly 14a to the track chain or conveyor speed, a constant distance is maintained between vehicle 10 and tube 14a. This distance between vehicle 10 and tube 14a may be approximately eighteen to twenty-four inches. Tube 14a advances approximately eighteen inches off the ground during this time.

At decision 618, a determination is made whether timer 1 is expired. If timer 1 is not expired, execution loops back to decision 612 and tube 14a continues to advance at the conveyor speed and tube 14a is raised as necessary to prevent vehicle 10 from striking tube 14a as shown at decision 612 and block 614. During this time, while timer 1 is running, fluid from nozzles 50 strikes the lower portion of the front of vehicle 10 to provide thorough cleaning of this area which typically is one of the dirtiest areas of vehicle 10. Furthermore, during this period, and all periods while fluid is being distributed from bar 500 to vehicle 10, rinse bar 500 oscillates as previously described in the discussion of tube assembly 14.

When timer 1 expires as determined at decision 618, rinse tube assembly 14a begins ramping upward from eighteen inches to approximately thirty-four inches above the ground to wash the rest of the front of vehicle 10. Tube assembly 14a may also be caused to follow a serpentine path as previously described rather than a ramping path. During this time, tube assembly 14a is raised as necessary to prevent vehicle 10 from striking tube assembly 14a if the light beams are interrupted due to some undetermined failure condition. Thus at decision 620 another determination is made whether any beams from light sources 512 are interrupted and if the termination is affirmative, tube 14a is raised as shown on block 622. Execution loops between decision 620 and block 622 until all beams are reestablished as previously described.

If all beams are established, tube assembly 14a continues to advance in the horizontal direction at the conveyor speed while ramping upwards to approximately thirty-four inches from the ground, at which level carriage housing 507 hits limit switch 526 positioned on vertical column 36a. Thus, in decision 626, a determination is made whether limit switch 526 has been hit. If limit switch 526 has not been hit, execution loops back and to decision 620, ramping upward and horizontal advancement continue while tube assembly 14a is raised as necessary to keep all beams established.

When limit switch 526 is hit, as determined in decision 626, the ramping upward of tube assembly 14a is finished and execution proceeds through offpage connector 628. If vehicle 10 has a large enough vertical dimension to strike limit switch 518, as determined at decision 606, tube assembly 14a is immediately ramped up to eighty inches while advancing horizontally at the conveyor speed as shown in block 610. In this case no timer is set and execution proceeds to offpage connector 628 directly.

Referring now particularly to FIG. 25B, execution begins at onpage connector 630 with tube assembly 14a at a height of eighty inches for vehicles large enough to strike limit switch 518 and a height of approximately thirty-four inches for all other vehicles. Tube assembly 14a continues to advance horizontally parallel to the ground at the conveyor speed for the remainder of its travel along horizontal support bar 66a. During this time, as always, tube assembly 14a is further raised as necessary to prevent vehicle 10 from striking tube assembly 14a.

Thus, at decision 632, a determination is made whether any beams produced by light sources 512 are interrupted and at block 634, tube assembly 14a is raised to reestablish all beams. If no beams are interrupted, tube assembly 14a advances horizontally at the conveyor speed as shown in block 636 until limit switch 524 is hit. When limit switch 524 is hit, as determined in decision 638, tube assembly 14a is at the far end of the fluid distribution system and front tracking is complete. Tube assembly 14a is rotated to point nozzles 510 downward as shown in block 640 to clean the upper surfaces of vehicle 10 and reverse slew is begun as shown on block 642.

Figure 26:
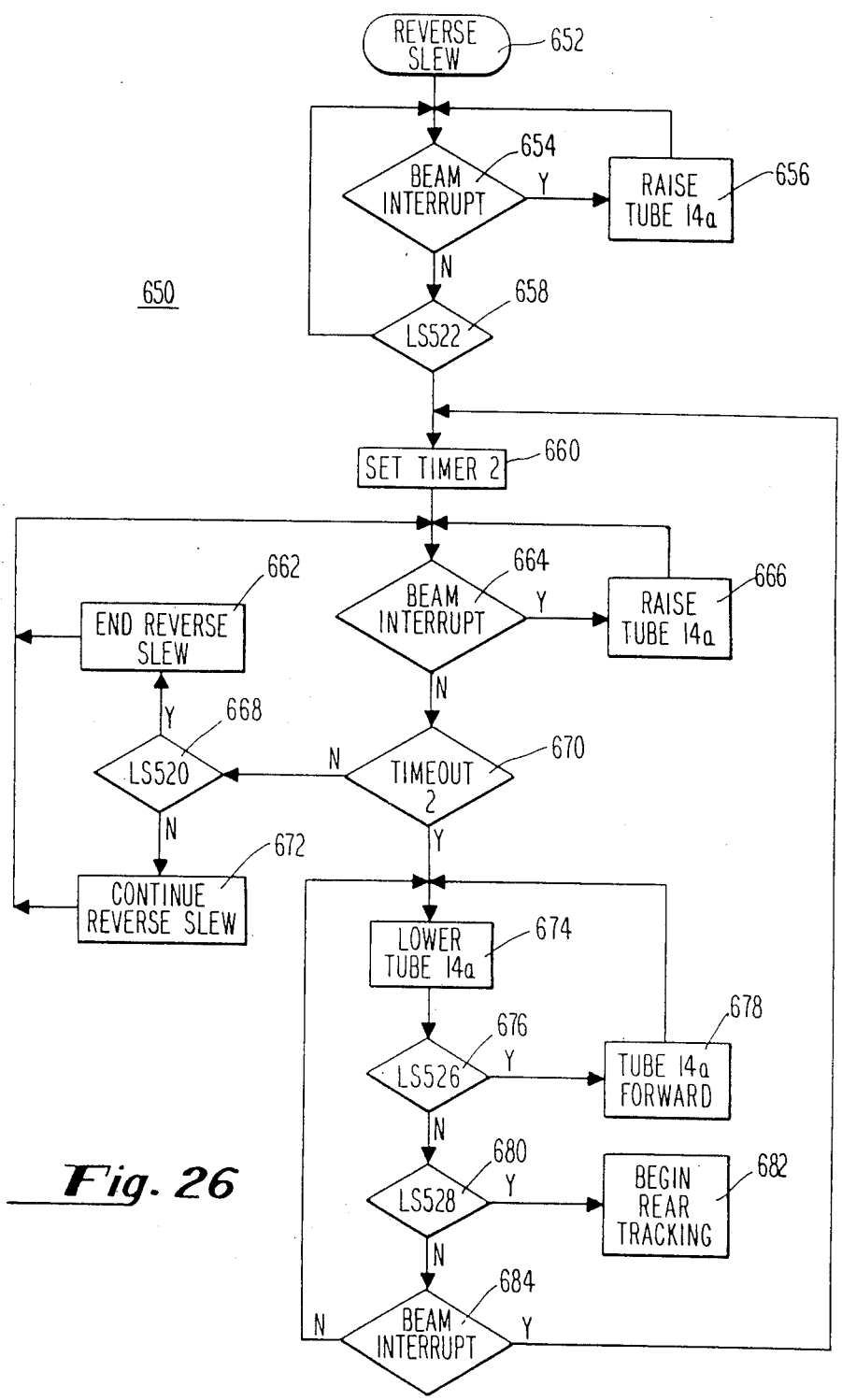
FIG. 26 is a flowchart representation of a reverse slew and contouring routine of the present invention.

Referring now to FIG. 26, reverse slew routine 650 is shown. Reverse slew routine 650 begins at terminal 652 and reverse slew proceeds with tube assembly 14a being raised as necessary to avoid striking vehicle 10 as previously described until tube assembly 14a reaches limit switch 522 which is positioned on horizontal support bar 66a at approximately the middle of the fluid distribution system. During this time, the hood and windshield and a portion of the top of vehicle 10 are contoured and cleaned. Contouring occurs because, in these areas of the car, the height of vehicle 10 is constantly increasing and tube assembly 14a is being raised as necessary to establish all beams. Thus, at decision 654, determination is made whether any beams are interrupted and, in block 656, tube assembly 14a is raised as necessary to reestablish the beams. When limit switch 522 has been hit, as determined in decision 658, further contouring of vehicle 10 may require raising or lowering of tube assembly 14a. Thus, tube assembly 14a is caused to seek the contour vehicle 10 once limit switch 522 is hit. Seeking of the contour of vehicle 10 is accomplished by lowering tube assembly 14a until at least one beam is broken and raising tube assembly 14a until the beam is reestablished. When the interrupted beam is reestablished, a timer is set and, unless a beam is broken first, the height is maintained until the timer expires. When the timer expires, tube assembly 14a is again lowered until a beam is interrupted in order to again seek the contour of vehicle 10.

Thus, in block 660, timer 2 is set. Timer 2, which thus serves as the contour seek time constant, is selected to have a duration of approximately 3 seconds. At decision 644, a determination is made whether any beam produced by any light source 512 is interrupted. If any beam is interrupted, as determined at decision 644, tube 14a is raised in block 666 until all beams are reestablished. When all beam are established, a determination is made at decision 670 whether timer 2 has expired. If timer 2 has expired, indicating it is time to again seek the contour vehicle 10, tube assembly 16a is lowered as shown in block 674. When tube 14a is being lowered during reverse slew, two determinations must be made in addition to a determination whether any beams are interrupted. The first determination, made at decision 676, is whether tube assembly 14a has been lowered back to the level of limit switch 526, indicating that the rear end of vehicle 10 has passed under tube assembly 14a. If the rear end of vehicle 10 has passed under tube assembly 14a as determined in decision 676, tube assembly 14a is rotated to point nozzles 510 in the direction of motion of vehicle 10 in order to begin cleaning the rear of vehicle 10 as tube assembly 14a is lowered.

The second determination which must be made while tube assembly 14a is being lowered, in addition to determining whether any beam is interrupted, is a determination made in decision 680 whether tube assembly 14a has been lowered to the bottom of its travel, approximately eighteen inches from the ground. This determination is affirmative when limit switch 528 on verticle column 36a is hit by housing 507. Limit switch 528 is positioned on column 36a at a height which causes limit switch 528 to be hit when rinse bar 500 is approximately eighteen inches from the ground.

At decision 684 routine 550 makes the contour seeking determination of whether any beam has been interrupted. If no beam is interrupted, execution loops back to block 674 and tube assembly 14a is further lowered. Thus execution returns from decision 684 to block 674 as many times as required to cause at least one beam to be interrupted. When a beam is interrupted, tube assembly 14a is done seeking the contour of vehicle 10 because the contour of vehicle 10 has been found and execution loops back to block 660 where timer 2 is reset. Immediately after timer 2 is reset in block 660, tube 14a is raised an amount sufficient to reestablish all beams by decision 664 and block 666 a previously described.

Until timer 2 again expires, as determined at decision 670, tube assembly 14a holds its height unless a beam is interrupted as determined at decision 664. While timer 2 is running, execution takes the NO path of decision 670 and checks whether reverse travel is finished. The end of reverse travel is indicated by limit switch 520 positioned on horizontal support bar 66a substantially at the entrance of the fluid distribution system.

If limit switch 520 has not been hit, as determined in decision 668, reverse slew is continued as shown in block 672. When limit switch 520 is hit, reverse slew is ended as shown in block 662, and horizontal movement of tube assembly 14a is terminated. From the time when reverse slew is terminated at block 662 until the time when the rear of vehicle 10 passes under tube assembly 14a, as determined in decision 676, tube assembly 14a remains at the entrance of the fluid distribution system and rises or falls as necessary to follow the contour of vehicle 10 while spraying downward on vehicle 10 passing underneath. When tube assembly 14a is lowered to its lowest point at approximately eighteen inches above the ground, as determined in decision 680, rear tracking of vehicle 10 is begun as shown in block 682.

Referring now to FIG. 27, rear tracking routine 700 is shown. Rear tracking routine 700 begins at start 702 and tube assembly 14a is advanced in the direction of motion of vehicle 10 horizontally at the conveyor speed. Because tube assembly 14a is advanced at conveyor speed, a constant distance is maintained between tube assembly 14a and the rear of vehicle 10. During this time, the bottom of the rear of vehicle 10 is cleaned. The upper regions of the rear of vehicle 10 have already been cleaned after block 678 of routine 650 was executed. As previously described, tube assembly 14a is rotated to spray forward in the direction of motion of vehicle 10 at block 678. From that time onward, while tube assembly 14a is lowered from limit switch 526 to limit switch 528, the upper regions of the rear of vehicle 10 are being sprayed.

At decision 708 a determination was made whether any beams are interrupted during rear tracking indicating, for example, that vehicle 10 has jumped off of the conveyor and that tube assembly 14a may strike the rear of vehicle 10. When a beam is broken, as determined in decision 706, a delay is executed as shown at block 708. Thus, tube assembly 14a delays indefinitely until all beams are reestablished.

At decision 710, a determination is made whether limit switch 522 has been hit, indicating that tube assembly 14a has returned approximately to the center of the fluid distribution system. If limit switch 522 has not been hit, execution loops back and advancement of tube assembly 14a continues. When limit switch 522 is hit, as determined in decision 710, tube 14a is rotated to point nozzles 510 in the direction opposite the direction of motion of vehicle 10 in order to be in position to acquire the next vehicle and distribute fluid to the front of the next vehicle. Execution then terminates at terminal 714.

In the fluid distribution system of the present invention, the following components of Advanced Interface Devices may be used for the operation and function as described and shown.

| Reference Number | Component |
|---|---|
| 600 | V2M-513, Advanced Interface Devices, Butler, Pennsylvania |
| 602 | TOM-24, Advanced Interface Devices, Butler, Pennsylvania |
| 604, 606 | MCM-33, Advanced Interface Devices, Butler, Pennsylvania |
| 614, 616 | AID-8, Advanced Interface Devices, Butler, Pennsylvania |

What is claimed:

1. A method for cleaning a vehicle moving along a path with respect to fluid distribution means which comprises the steps of:
   imaging the vehicle from a fixed location to develop control signals representative of the location of the vehicle along the path and the profile of the vehicle, including the horizontal and vertical extents of the vehicle;
   moving the fluid distribution means horizontally in front of and to lead the vehicle and in the direction of movement of the vehicle in accordance with said control signals;
   distributing fluid by the fluid distribution means onto the front of the vehicle while the fluid distribution means lead the vehicle;
   moving the fluid distribution means vertically and horizontally above the vehicle from the front of the vehicle to the rear of the vehicle in accordance with said control signals;
   distributing fluid by the fluid distribution means onto the top portions of the vehicle while the fluid distribution means move above the vehicle from the front of the vehicle to the rear of the vehicle;
   moving the fluid distribution means horizontally behind and follow the vehicle and in the direction of movement of the vehicle in accordance with said control signals;
   said distributing fluid by the fluid distribution means onto the rear of the vehicle while the fluid distribution means follow the vehicle.

2. The method of claim 11 wherein the control signals representative of the profile of the vehicle are developed prior to distributing any fluid onto any portion of the vehicle.

3. The method of claim 11 wherein the step of moving the fluid distribution means horizontally in front of and to lead the vehicle further includes moving the fluid distribution means alternately above and below a predetermined vertical position while the fluid distribution means move horizontally at approximately the same speed as the vehicle and the step of moving the fluid distribution means horizontally behind and to follow the vehicle further includes moving the fluid distribution means alternately above and below a predetermined vertical position while the fluid distribution means move horizontally at approximately the same speed as the vehicle.

4. The method of claim 3 wherein the movements of the fluid distribution means alternately above and below determined vertical positions follows sinusoidal paths.

5. The method of claim 1 wherein the fluid distribution means are moved in front of the vehicle for a predetermined period of time throughout which fluid is distributed onto the front of the vehicle and behind the vehicle for a predetermined period of time throughout which the fluid is distributed onto the rear of the vehicle.

6. The method of claim 1 wherein the fluid distributed means move in front of and to lead the vehicle at approximately the same speed as the vehicle and behind and to follow the vehicle at approximately the same speed as the vehicle.

7. A method for cleaning the front of a vehicle moving along a path with respect to fluid distribution means which comprises the steps of:
   imaging the vehicle from a fixed location to develop control signals representative of the location and profile of the vehicle along the path;
   moving the fluid distribution means horizontally in front of the vehicle at approximately the same speed as the vehicle and in the direction of movement of the vehicle and tending to maintain a predetermined horizontal distance between the vehicle and the fluid distribution means in accordance with said control signals; and
   distributing fluid by the fluid distribution means onto the front of the vehicle while the fluid distribution means are in front of the vehicle.

8. The method of claim 7 wherein the step of moving the fluid distribution means further includes moving the fluid distribution means alternately above and below a predetermined vertical position while the fluid distribution means move horizontally at approximately the same speed as the vehicle.

9. The method of claim 8 wherein the movement of the fluid distribution means alternately above and below a predetermined vertical position follows a sinusoidal path.

10. The method of claim 7 wherein the fluid distribution means are moved in front of the vehicle for a predetermined period of time throughout which fluid is distributed onto the front of the vehicle.

11. A method for cleaning the rear of a vehicle moving along a path with respect to fluid distribution means which comprises the steps of:
   imaging the vehicle from a fixed location to develop control signals representative of the location and profile of the vehicle along the path;
   moving the fluid distribution means horizontally behind the vehicle at approximately the same speed as the vehicle and in the direction of movement of the vehicle and tending to maintain a predetermined horizontal distance between the vehicle and the fluid distribution means in accordance with said control signals; and
   distributing fluid by the fluid distribution means onto the rear of the vehicle while the fluid distribution means are behind the vehicle.

12. The method of claim 11 wherein the step of moving the fluid distribution means further includes moving the fluid distribution means alternately above and below a predetermined vertical position while the fluid distribution means move horizontally at approximately the same speed as the vehicle.

13. The method of claim 12 wherein the movement of the fluid distribution means alternately above and below a predetermined vertical position follows a sinusoidal path.

14. The method of claim 11 wherein the fluid distribution means are moved behind the vehicle for a predetermined period of time throughout which fluid is distributed onto the rear of the vehicle.

15. An automated car wash system, comprising:
   (a) conveyor means for transporting a vehicle through the system,
   (b) means for sensing the height of the vehicle at a given location, the sensing means being capable of repeated measurements of the height of the vehicle as the vehicle passes said location, the sensing means thereby being capable of generating a signal representing the contour of the vehicle,
   (c) a carriage means, the carriage means including nozzle means, the carriage means being movable in the direction of motion of the vehicle and in the reverse of said direction, and also being movable vertically, the carriage means being movable while the vehicle is moving, and
   (d) means for controlling the movement of the carriage means, the controlling means being connected to the sensing means, the controlling means being programmed to move the carriage means so as to follow the contour of the vehicle while the vehicle is moving.

16. The system of claim 15, wherein the nozzle means is disposed on a spray bar, the spray bar being mounted to move with the carriage means.

17. The system of claim 16, further comprising means for rotating the spray bar about the longitudinal axis of the spray bar, wherein the position of the nozzle means can be adjusted.

18. An automated car wash system, comprising non-contacting means for sensing the contour of a vehicle from a fixed location, and means for controlling a spraying means, the spraying means being movable in the direction of travel of the vehicle and in the reverse of said direction of travel, the spraying means also being movable in a vertical direction, the spraying means being movable while the vehicle is moving, the controlling means being programmed to direct the spraying means both along the direction of travel of the vehicle and in a vertical direction, such that the spraying means passes around the contour of the vehicle while the vehicle is moving.

19. The system of claim 18, wherein the spraying means includes a nozzle, wherein the controlling means also controls the orientation of the nozzle, and wherein the controlling means is programmed to point the nozzle towards the vehicle as the spraying means moves around the contour of the vehicle.

20. The system of claim 19, wherein the system is programmed to tend to prevent physical contact between the vehicle and the spraying means.

21. A method of automatically washing a vehicle in a system having a position sensing station and a washing station, comprising the steps of:
   (a) moving the vehicle past the sensing station, and through the washing station,
   (b) repeatedly measuring the height of the portion of the vehicle which is closest to the sensing station,
   (c) actuating a washing mechanism when the vehicle approaches the washing mechanism,
   (d) moving the washing mechanism in the same direction as the vehicle, while the vehicle is moving, while continuing to operate, the washing mechanism,
   (e) reversing the direction of the washing mechanism, and causing the washing mechanism to follow the general contour of the vehicle, while the vehicle is moving, while washing the vehicle, and
   (f) reversing the direction of the washing mechanism, after the washing mechanism has traveled along the contour of the vehicle, such that the washing mechanism again travels in the same direction as the vehicle, while the vehicle is moving, while continuing to wash the vehicle.

22. A method of automatically washing a vehicle, comprising the steps of determining the contour of the vehicle from a fixed location without touching the vehicle, and storing information corresponding to said contour, and moving a washing mechanism around the contour of the vehicle while the vehicle is moving, the washing mechanism being moved along the path of the vehicle and in a vertical direction, such that the washing mechanism does not contact the vehicle.

23. The method of claim 22, wherein the moving step is performed while maintaining the washing mechanism at a substantially constant distance from the vehicle.

24. The method of claim 23, wherein the moving step is preceded by the step of holding the washing mechanism at a substantially constant distance from the front of the vehicle, while washing the front of the vehicle.

25. The method of claim 24, wherein the moving step is followed by the step of holding the washing mechanism at a substantially constant distance from the rear of the vehicle, while washing the rear of the vehicle.

26. The system of claim 18, wherein the sensing means is distinct from the spraying means, and wherein the sensing means is spaced apart from the spraying means, such that a vehicle entering the system passes the sensing means before reaching the spraying means.

27. The system of claim 18, further comprising a conveyor means for transporting a vehicle through the system, means for determining the speed of the conveyor means, and means responsive to said speed-determining means for controlling the speed of movement of the spraying means, wherein the speed of movement of the spraying means is directly related to the speed of the conveyor means.

28. The system of claim 18, wherein the spraying means includes at least one nozzle, the position of the nozzle being substantially continuously variable, the position of the nozzle being controlled by the controlling means, whereby the nozzle can remain pointed at the vehicle while the nozzle is moved along the contour of the vehicle.

29. An automated car wash system, comprising a movable carriage and a sensing means having a fixed location, the system defining a path for travel of a vehicle through the system, the carriage having a spraying means for washing the vehicle, the sensing means being distinct from the carriage the carriage being movable relative to the sensing means, the sensing means being located such that a vehicle entering the system approaches the sensing means before the vehicle approaches the carriage, the system including means, connected to the sensing means, for determining the contour of the vehicle before the vehicle has reached the carriage means, the means for moving the carriage means along the contour of the vehicle while the vehicle is in motion.

30. The system of claim 29, wherein the carriage is movable both in a horizontal and a vertical direction, and wherein the carriage is capable of following the vehicle along its path of travel.

31. The system of claim 29, further comprising a conveyor means for directing the vehicle through the system, means for determining the speed of the conveyor means, and means for controlling the speed of the carriage, the controlling means being connected to the speed-determining means, such that the speed of the carriage is directly related to the speed of the conveyor means.

32. The method of claim 22, wherein the step of determining the contour of the vehicle is performed before the step of moving the washing mechanism around the vehicle.

33. The method of claim 22, wherein the vehicle is moved by a conveyor means, and further comprising the steps of monitoring the speed of the conveyor means, and controlling the speed of the washing mechanism in response to the detected speed of the conveyor means.

34. The method of claim 22, wherein the washing mechanism includes at least one nozzle, the orientation of the nozzle being substantially continuously variable, and wherein the method further comprises the step of varying the orientation of the nozzle while moving the washing mechanism.

35. A method of automatically washing a vehicle, comprising the steps of determining the contour of the vehicle by directing the vehicle past a stationary sensing means, and moving a washing mechanism around the contour of the vehicle while the vehicle is in motion, the washing mechanism being moved along the path of travel of the vehicle, the moving step being performed after the contour-determining step, such that the contour of at least part of the vehicle is determined before the washing mechanism is moved.

36. The method of claim 35, wherein the moving step comprises moving the washing mechanism in both a horizontal and a vertical direction.

37. The method of claim 35, wherein the directing step is accomplished with a conveyor, and wherein the method includes the steps of determining the speed of the conveyor and controlling the speed of the washing mechanism according to the speed of the conveyor.

38. An automated car wash system, comprising means for sensing the contour of a vehicle from a fixed location, and means for controlling a spraying means, the spraying means being movable in the direction of travel of the vehicle and in the reverse of said direction of travel, the spraying means also being movable in a vertical direction, the controlling means being programmed to direct the spraying means both along the direction of travel of the vehicle and in a vertical direction, such that the spraying means passes around the contour of the vehicle, further comprising a conveyor means for transporting a vehicle through the system, means for determining the speed of the conveyor means, and means responsive to said speed-determining means for controlling the speed of movement of the spraying means, wherein the speed of movement of the spraying means is directly related to the speed of the conveyor means.

39. An automated car wash system, comprising a movable carriage and a stationary sensing means, the system defining a path for travel of a vehicle through the system, the carriage having spraying means for washing the vehicle, the sensing means being distinct from the carriage, the carriage being movable relative to the sensing means, the sensing means being located such that a vehicle entering the system approaches the sensing means before the vehicle approaches the carriage, the system including means, connected to the sensing means, for determining the contour of the vehicle before the vehicle has reached the carriage means, and means for moving the carriage means along the contour of the vehicle, further comprising a conveyor means for directing the vehicle through the system, means for determining the speed of the conveyor means, and means for controlling the speed of the carriage, the controlling means being connected to the speed-determining means, such that the speed of the carriage is directly related to the speed of the conveyor means.

40. A method of automatically washing a vehicle, comprising the steps of determining the contour of the vehicle from a fixed location, and storing information corresponding to said contour, and moving a washing mechanism around the contour of the vehicle, the washing mechanism being moved along the path of the vehicle and in a vertical direction, such that the washing mechanism does not contact the vehicle, wherein the vehicle is moved by a conveyor means, and further comprising the steps of monitoring the speed of the conveyor means, and controlling the speed of the washing mechanism in response to the detected speed of the conveyor means.

41. A method of automatically washing a vehicle, comprising the steps of determining the contour of the vehicle by directing the vehicle past a stationary sensing means, and moving a washing mechanism around the contour of the vehicle while the vehicle is in motion, the moving step being performed after the contour-determining step, such that the contour of at least part of the vehicle is determined before the washing mechanism is moved, wherein the directing step is accomplished with a conveyor, and wherein the method includes the steps of determining the speed of the conveyor and controlling the speed of the washing mechanism according to the speed of the conveyor.

42. A method of automatically washing a vehicle, comprising the steps of determining the contour of the vehicle, without touching the vehicle, by directing the vehicle past a stationary sensing means, and moving a washing mechanism around the sensed contour of the vehicle while the vehicle is in motion, the washing mechanism being moved along the path of travel of the vehicle and in the vertical direction, wherein the washing mechanism is maintained at a substantially uniform distance from the vehicle while performing the washing.

43. An automated system for washing a vehicle, comprising means for determining the contour of the vehicle from a fixed location without touching the vehicle, a washing mechanism which is movable around the contour of the vehicle while the vehicle is in motion, and controller means, the controller means being connected to the contour-determining means, the controller means being programmed to move the washing mechanism around the contour of the vehicle while the vehicle is in motion, the controller means being programmed to move the washing mechanism along the path of travel of the vehicle and in the vertical direction.

* * * * *